United States Patent
Lusky et al.

(10) Patent No.: US 7,315,573 B2
(45) Date of Patent: Jan. 1, 2008

(54) CHANNEL MONITORING FOR IMPROVED PARAMETER SELECTION IN A COMMUNICATION SYSTEM

(75) Inventors: Itay Lusky, Hod Hasharon (IL); Daniel Wajcer, Beit-Yehoshua (IL); Yosef Bendel, Holon (IL); Yigal Bitran, Tel Aviv (IL); Naftali Sommer, Rishon le Zion (IL); Ofir Shalvi, Herzlia (IL); Zvi Reznic, Tel-Aviv (IL); Ariel Yagil, Ramat-Hasharon (IL); Eli Haim, Herzeliya (IL)

(73) Assignee: Texas Instruments Incorporated, Dallas, TX (US)

( * ) Notice: Subject to any disclaimer, the term of this patent is extended or adjusted under 35 U.S.C. 154(b) by 666 days.

(21) Appl. No.: 10/273,556

(22) Filed: Oct. 18, 2002

(65) Prior Publication Data
US 2003/0179821 A1    Sep. 25, 2003

Related U.S. Application Data

(60) Provisional application No. 60/360,494, filed on Feb. 28, 2002.

(51) Int. Cl.
*H04B 3/46* (2006.01)
*H04B 17/00* (2006.01)
*H04Q 1/20* (2006.01)

(52) U.S. Cl. .............. 375/224; 375/225; 375/340; 370/465

(58) Field of Classification Search .......... 375/224, 375/261, 225, 340; 714/708; 455/455; 370/335, 370/465
See application file for complete search history.

(56) References Cited

U.S. PATENT DOCUMENTS

| | | | |
|---|---|---|---|
| 5,054,034 A | | 10/1991 | Hartogs |
| 5,699,365 A | * | 12/1997 | Klayman et al. ........... 714/708 |
| 5,828,695 A | | 10/1998 | Webb |
| 6,901,046 B2 | * | 5/2005 | Hsu et al. .................... 370/204 |
| 7,013,146 B2 | * | 3/2006 | Wang et al. ................ 455/455 |
| 7,206,332 B2 | * | 4/2007 | Kwan et al. ................ 375/140 |
| 2002/0044610 A1 | * | 4/2002 | Jones ......................... 375/261 |
| 2002/0094782 A1 | * | 7/2002 | Lin ........................... 455/67.1 |
| 2003/0185175 A1 | * | 10/2003 | Golitscheck et al. ........ 370/335 |
| 2004/0015765 A1 | * | 1/2004 | Cooper et al. .............. 714/750 |

(Continued)

FOREIGN PATENT DOCUMENTS

WO    0072496 A1    11/2000

OTHER PUBLICATIONS

"Detection and Classification of RF Impairments for Higher Capacity Upstreams Using Advanced TDMA," NCTA 2002 Proceedings, May 7-10, 2002 (Daniel Howard—Broadcom Corporation).

(Continued)

*Primary Examiner*—Phuong Phu
(74) *Attorney, Agent, or Firm*—Steven A. Shaw; W. James Brady; Frederick J. Telecky, Jr.

(57) ABSTRACT

A method is provided for automatically improving throughput of an active channel in a communication system comprising: receiving input from one or more modules that identify and characterize impairments in the active channel; monitoring the input to track changes in the impairments; and changing channel parameters to improve throughput on the channel based on the changes in the impairments. Other systems and methods are disclosed.

5 Claims, 13 Drawing Sheets

OTHER PUBLICATIONS

Lusky, Itay et al; Adaptive Algorithms for Choosing Transmission Parameters in Dynamic Channel Conditions; 2002 IEEE; pp. 53-56.

Geri, Noam et al; Optimizing Transmission Parameters in DOCSIS 2.0 with a Digital Upstream Channel Analyzer (DUCA); Aug. 2002; pp. 1-8.

* cited by examiner

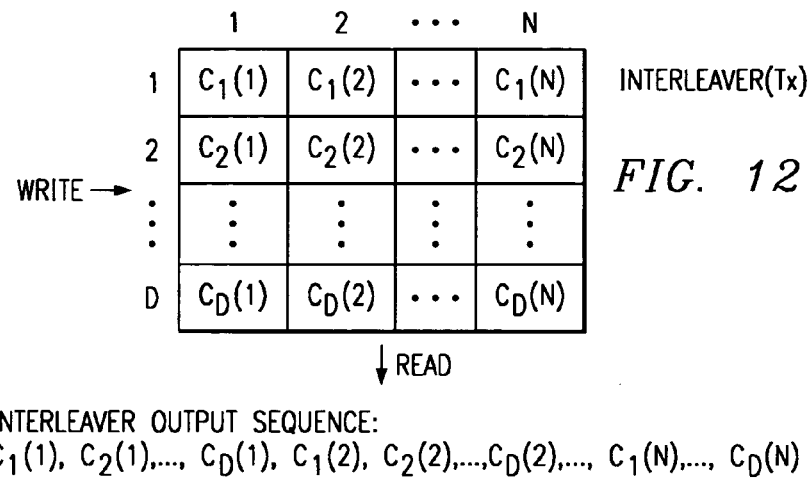
FIG. 12
INTERLEAVER OUTPUT SEQUENCE:
$C_1(1), C_2(1),..., C_D(1), C_1(2), C_2(2),...,C_D(2),..., C_1(N),..., C_D(N)$
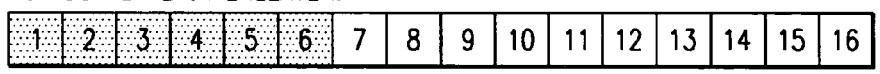
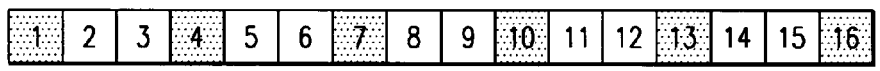
FIG. 13
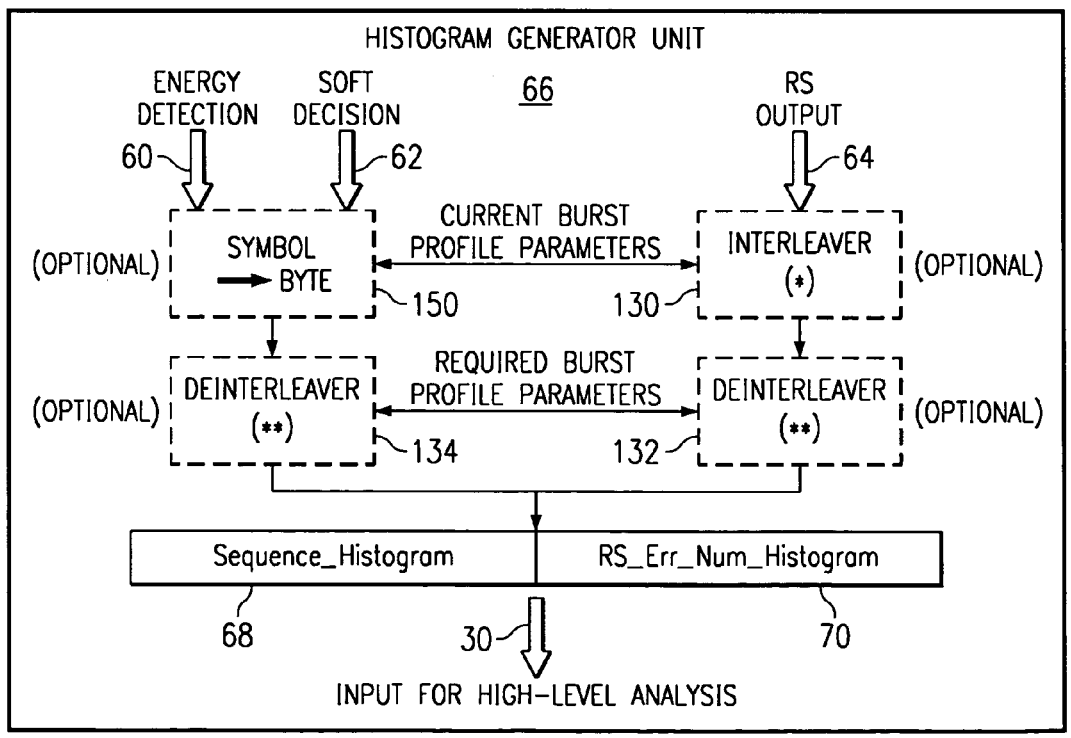
FIG. 14

FIG. 15 RS HISTOGRAM (INCLUDING INTERLEAVER/DEINTERLEAVER)

CHANNEL MONITORING FOR IMPROVED PARAMETER SELECTION IN A COMMUNICATION SYSTEM

This application claims priority under 35 USC § 119(e)(1) of Provisional Application Ser. No. 60/360,494 filed Feb. 28, 2002. Additional coassigned patent applications also claim priority from this Provisional Application.

FIELD OF THE INVENTION

This invention generally relates to communication systems, and more specifically to systems and methods for improving parameter selection.

BACKGROUND OF THE INVENTION

The goal of modern communication systems is to provide their operator the best of all worlds. In severe channel conditions it is desirable to provide sophisticated coding schemes and robust transmission at the expense of achieved capacity. In moderate channels conditions it is desirable to provide maximal throughput at the expense of robustness to channel impairments. As a result, the need to provide operators the option to address such a diverse set of channels led many contemporary common standards to include a wide variety of transmission parameters.

The allowed transmission parameters may include different modulation types, constellation sizes and baud rates. Transmission power may be an important parameter, as well as the carrier frequency used. Different error correction schemes can be used such as Reed Solomon (RS) codes, Convolutional codes (such as Trellis Coded Modulation (TCM) codes and Turbo codes) and concatenated codes. Different coding rates can be used. Interleaving can be used in order to introduce time diversity. In such a case, a tradeoff between required interleaver effect and the added processing delay is usually taken into consideration. A training sequence may be used. In that case, it is desirable to properly choose the spectral characterization of the training sequence, its length, power, and constellation. All the possibilities described above may be allowed in a single communication system.

Various examples of common communication systems that allow a subset of the above possibilities are described below. The data over cable service interface specification (DOCSIS) 2.0 standard for the upstream channel is an example of a standard providing the user substantial tools to accommodate various channel impairments. The Wireless LAN 802.11 standard, with its various flavors, offers the use of several transmission parameters, such as center frequency modulation scheme (Barker/CCK/PBCC/OFDM), transmission rate, transmission power, and preamble properties. Due to the typical wireless channel parameters it is extremely important to identify the channel conditions and make a decision accordingly about what transmission parameters to use. The home phone line networking alliances (HPNA) 2.0 standard allows use of a variety of constellations (QPSK-256QAM) and different baud-rates (2 Mbaud or 4 Mbaud). This results in an achievable throughput of 4 Mbit/sec up to 32 Mbit/sec, as a function of the channel conditions. Another example of a communication system that provides numerous transmission parameters is the telephony V.34 modem. This modem provides the ability to use various constellations (from QPSK to over 1500 constellation points), six baud rates, center frequencies (two options for each baud rate), constellation shaping, control of the transmission power, the use of training sequence (TRN), and also provides tools to mitigate non-linear distortions. Dedicated signals are provided for channel characteristic analysis. These signals include training sequence (TRN), frequency comb (L1, L2), Mean Square Error (MSE) measurements and more.

After several years of ongoing debate, cable operators have selected advanced time division multiple access (A-TDMA) and synchronous code division multiple access (S-CDMA) as the upstream modulations in the DOCSIS 2.0 specification. Both of these technologies were also included in the IEEE 802.14a specification. These technologies offer cable operators the opportunity to better utilize their cable infrastructure and to generate more revenue from increased use of the cable network upstream spectrum. DOCSIS 2.0 offers operators powerful tools to mitigate common channel impairments and spectrally efficient modulations to maximize the throughput in the bandwidth-limited upstream channel. However, the many tools in DOCSIS 2.0 make the selection of transmission parameters extremely difficult in comparison to DOCSIS 1.0, with the performance of DOCSIS 2.0 systems greatly depending on the choice of these parameters.

A-TDMA is essentially an evolution of DOCSIS 1.0. It extends the physical layer of DOCSIS 1.0/1.1 with the following enhancements: 1) Additional constellations: 8-QAM, 32-QAM and 64-QAM. This allows an increase in spectral efficiency by as much as 50 percent in good quality channels and provides more increments in spectral efficiency for finer matching of data rate with existing channel SNR. 2) Additional Symbol Rate: 5.12 MB (Mega Baud). This reduces the number of receivers required at the headend for a given plant by a factor or two and improves network efficiency due to statistical multiplexing of more users in an upstream channel. 3) A byte interleaver to spread the effect of impulse and burst noise over time. 4) Improved error correction codes. DOCSIS 2.0 extends the maximum error protection ability of DOCSIS 1.0's Reed-Solomon FEC from 10 byte errors to 16 byte errors, providing greater robustness to burst and impulse noise. 5) An improved pre-equalizer for mitigating multipath distortions.

S-CDMA adds to the above enhancements a spreader that provides greater immunity to severe cases of impulse noises, and Trellis Coded Modulation, which improves performance for white noise and additional constellation of 128QAM. When in S-CDMA mode, there is no byte interleaver as described above. Instead, an S-CDMA framer introduces time (as well as code) diversity. S-CDMA calls for much stricter timing requirements in order to maintain code diversity, allowing for the elimination of guard time between data packets.

The goal of modern communication systems is to be robust while maximizing achieved capacity. To achieve this goal many standards allow the use a variety of coding schemes, constellations, error coding capabilities and other transmission parameters. The actual transmission parameters in use should be tailored to the actual channel conditions. However, in current systems, operators tend to choose overly robust transmission parameters just to be on the safe side. This results in an inefficient use of bandwidth, and a substantial decrease in capacity. In fact, standards such as DOCSIS 2.0 will only provide significant benefits to operators if and when systems make proper use of the many tools in this standard. Hence, there is a need for methods and systems that analyze channel impairments and determine the optimal transmission parameters accordingly.

SUMMARY OF THE INVENTION

In general, and in a form of the present invention methods and systems for automatically improving throughput of an active channel in a communication system are provided. An exemplary method includes: receiving input from one or more modules that identify and characterize impairments in the active channel; monitoring the input to track changes in the impairments; and changing channel parameters to improve throughput on the channel based on the changes in the impairments. In another exemplary method, a method is provided to automatically estimate channel throughput if a different order constellation from current constellation size is used in a communication system including the steps of: receiving input from one or more modules that identify and characterize impairments in the channel; analyzing the impairments to generate statistics on occurrences of impairments; choosing a new constellation size; and estimating channel throughput for the new constellation size based on the statistics on occurrences of impairments. An exemplary method to automatically optimize channel throughput using current constellation size in a communication system having a plurality of parameters and a current data rate is also provided and may include the steps of: receiving input from one or more modules that identify and characterize impairments in the channel; analyzing the impairments to generate statistics on occurrences of impairments; choosing new forward error correction parameters different from current forward error correction parameters; choosing a frame error target; estimating a new frame error rate and a new data rate for the new forward correction parameters based on the impairments; and replacing the current forward error correction parameters with the new forward error correction parameters if the new data is greater than the current data rate and the new frame error rate is lower than the frame error target. In yet another exemplary method, a method to automatically monitor and optimize channel performance in a communication system having a plurality of parameters in provided and may include the the steps of: receiving input from the channel, the input having a data rate and a frame error rate; comparing the current frame error rate to a frame error target; and modifying the parameters if the frame error rate is greater than the frame error target such that the frame error rate is less than or equal to the frame error target and the data rate is optimized. Various embodiments of these exemplary methods are also disclosed. Methods and systems of the present invention are provided that may be utilized in various transmission scenarios. The present invention may be applied, for example, to receivers, front-ends, transmitters, transceivers and other elements of communication system. Other methods and systems are also disclosed.

BRIEF DESCRIPTION OF THE DRAWINGS

Particular embodiments in accordance with the invention will now be described, by way of example only, and with reference to the accompanying drawings in which like reference signs are used to denote like parts, and in which:

FIG. 12 is an exemplary implementation of an interleaver of the present invention;

FIG. 13 illustrates an embodiment of an interleaver approach of the present invention;

FIG. 14 is an exemplary implementation of a histogram generator unit of the present invention;

Corresponding numerals and symbols in the different figures and tables refer to corresponding parts unless otherwise indicated.

DETAILED DESCRIPTION OF EMBODIMENTS OF THE INVENTION

Figure 1:
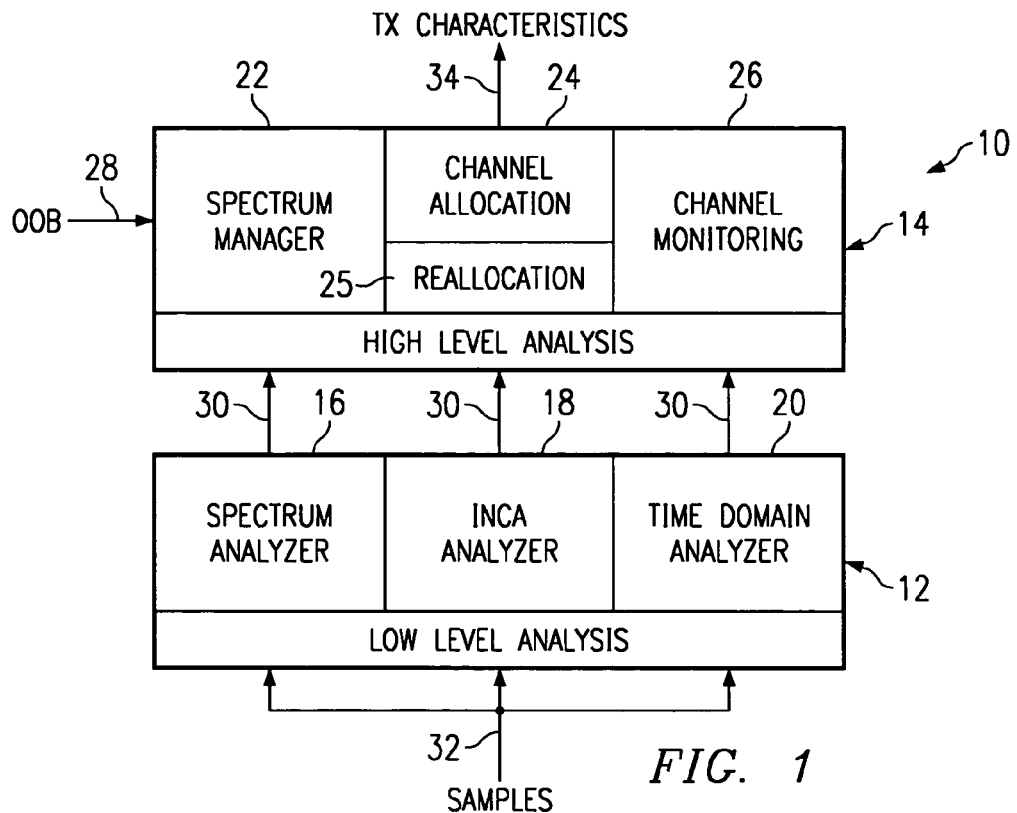
FIG. 1 is a block diagram of an embodiment of the present invention.

Although the invention finds particular application to and is described in relation to upstream communication in cable system it also finds application to other forms of communication such as downstream communication and applications besides cable. Although specific embodiments address optimizing receiver parameters, the present invention finds application to optimizing other transmission parameters of a communication system.

In general, communication systems today lack the ability to dynamically analyze channel conditions and to automatically choose transmission parameters accordingly. This is particularly true for broadband communication systems that are relatively less mature. For example, a new generation of DOCSIS 2.0 cable modem and cable modem termination systems (CMTS) offer cable operators the promise of increased upstream capacity and greater robustness to common channel impairments such as ingress and impulse noise. It is already clear that the many tools in the new DOCSIS 2.0 standard that allow for efficient use of the upstream spectrum and mitigation of impairments also make the task of optimizing transmission parameters increasingly difficult. In fact, the performance of a DOCSIS 2.0 based CMTS will greatly depend on its ability to dynamically assess upstream channel conditions and set the transmission parameters accordingly. In general, the efficient use of the tools provided in various standards such as HPNA and DOCSIS 2.0 requires an adaptive mechanism as provided by the present invention to analyze and track varying channel conditions.

The present invention provides methods and systems to optimally allocate new channels to use, to determine what transmission parameters should be used in order to achieve maximal channel throughput and to automatically adapt the transmission parameters to varying channel conditions. This approach eliminates the need to assume worst case scenario (i.e., low constellation, strong FEC) when unnecessary.

In the present invention a technology is provided, in various embodiments, which measures the impairments in the upstream channel and sets the transmission parameters for maximum throughput based on time-domain and frequency-domain analysis. In the upstream embodiments provided herein the technology is referred to as Digital Upstream Channel Analyzer (DUCA™).

The cable network upstream channel is usually the weakest link in the cable network infrastructure. Given the tree-and-branch topology of the cable network, noise and interferences from the entire network are accumulated at the headend. Common upstream impairments include the following noise sources: 1) White noise generated by active components in the network. 2) Narrowband ingress noise, typically generated by other transmitters such as amateur radio signals or resulting from Common Path Distortion. 3) High rate impulse noise originating from electric current. These impulses are short, typically less than one microsecond duration, and have a repetition rate of between several hundred to a few thousand occurrences per second. 4) Low rate wideband burst noise originating from several sources including electrical appliances in homes and laser clipping. These bursts could occur as frequently as every 10-20 seconds and could last as long as 10-50 microseconds.

In addition to the noise sources described above, the upstream signal is subject to multi-path reflections due to impedance mismatch of the plant's components and unterminated cables. The present invention provides, in various embodiments, methods and systems for optimal channel allocation and selection of transmission parameters. DUCA analyzes the entire upstream spectrum, measures and records noise and impairment conditions, and sets the parameters of the various noise mitigating tools optimally for maximum upstream throughput. Proper selection of parameters, using DUCA, ensures that operators will benefit significantly from the new improved upstream PHY.

DOCSIS 2.0 provides a new challenge in setting transmission parameters. While DOCSIS 1.0 provided operators with some limited flexibility in setting transmission parameters to match the varying channel conditions, in practice, parameters remained relatively static. Without the ability to track dynamic changes in the plant, operators had no choice but to set transmission parameters to the most robust mode (QPSK, Reed Solomon T=10) to accommodate worst-case scenarios. With penetration still low, such inefficient use of the upstream spectrum could be tolerated. Without ingress cancellation available to them, operators would typically set the frequency manually to ensure the transmission signals are within a region with little or no ingress. The more sophisticated CMTSs could automatically identify that ingress is interfering with the data signal and automatically shift modems to a different upstream frequency with no interference.

DOCSIS 2.0 requires a much more sophisticated setting mechanism. First, there are many parameters to play with, such as modulation type (A-TDMA or S-CDMA), constellation, baud-rate, transmission power, preamble length and type, center frequency, error correction capability, interleaver parameters, spreader parameters and number of active codes in S-CDMA mode. Second, the premise of DOCSIS 2.0 is that the upstream traffic is significantly higher, with upstream channel throughput closer to capacity, leaving less room in the spectrum to avoid interferences, and making it crucial to efficiently utilize the channel spectrum.

The first step in setting optimal parameters is measuring channel conditions and detecting interferences. The most common tool in current CMTSs is upstream spectral analysis. Using wideband sampling and FFT, or alternatively using a frequency-sweeping filter, the upstream spectrum can be measured, identifying frequencies with ingress. This spectrum measurement is typically used to find ingress free regions for the data signals. However, with ingress cancellation technology INCA™ (INgress CAncellation-INcreased CApacity) burst receiver, avoiding the ingresses is no longer necessary. While transmitting in an ingress free region is always desirable, a clean spectrum block, which is wide enough to accommodate the highest baud-rate, is not always available. In such cases a CMTS needs to make a decision on whether to reduce baud rate, allowing the signal to fit between other signals and interferences or to maintain the high baud rate and to cancel the interference with ingress cancellation technology. Given that ingress cancellation techniques allow for operation in negative C/I ratios (i.e. ingress that is stronger than the data signals), it is foreseeable that in many cases the parameter setting mechanism will determine that maintaining the higher baud rate while overlapping the ingress will result in higher throughput than if the baud rate were reduced and the ingress avoided. Ingress cancellation technology and the new modes of operation in DOCSIS 2.0 have transformed the traditional spectrum analysis of finding ingress free regions into a more complex optimization problem of setting baud rate, center frequency, constellation, coding and other parameters to maximize upstream throughput given the constraints of available spectrum, detected ingress and the performance of the ingress cancellation technology. Furthermore, as channel conditions change, these transmission parameters need to be adapted to the new environment. Tracking spectrum changes in an upstream channel densely occupied with data signals, and having to change in some cases the center frequency, baud rate and other transmission parameters of multiple upstream data signals concurrently in order to achieve higher throughput makes this ongoing optimization problem particularly challenging.

DOCSIS 2.0 provides new tools for mitigating impulse and burst noise, such as: byte interleavers, stronger Reed Solomon error correction, and S-CDMA spreading. In order to avoid unnecessary waste of bandwidth on a spectrally inefficient constellation or on coding overhead, the DOCSIS 2.0 CMTS needs to dynamically track impulse levels, and to optimally set the relevant parameters accordingly. Impulse strength, as well as impulse frequency and arrival statistics can be determined by employing various power detectors, which measure the signal level during quiet periods or in adjacent unoccupied frequencies. Finding quiet periods of time or unoccupied frequencies for measuring impulses may not be easy when operating close to channel capacity. In such cases the CMTS may have to regularly block time slots for impulse detection. To avoid wasting bandwidth on impulse detection, impulses can also be detected by analyzing decision errors, however this method is problematic since error measurements will be erroneous during impulse occurrences (because the error measurement relies on an incorrect decision). To overcome this problem, transmitted symbols and decision errors can be estimated by re-encoding corrected data bits after the Reed Solomon decoder. However, this results in a relatively complex algorithm.

A DOCSIS 2.0 CMTS has multiple tools for impulse mitigation. The spreading function of S-CDMA spreads the effect of the impulse over time and over the code space. This is a useful tool when impulse levels are limited, however if the impulse is very strong, spreading may actually decrease performance by causing multiple errors from every impulse (due to spreading) instead of taking the hit only once. In addition to spreading, Reed Solomon parameters are also candidates for adjusting based on measured impulse rates. Less intuitive, is the choice of baud-rate and constellation. Traditionally, the most common reaction to impulse noise in the channel is reducing baud-rate and reducing the constellation size, which indeed makes the signal more robust to moderate impulses. However, this comes at the expense of upstream throughput. A better approach may actually be to transmit at a high baud-rate using one of the larger constellations, thereby allowing more coding information, which will enable impulse mitigation with Reed Solomon coding. Various factors such as impulse power, impulse frequency and upstream channel utilization will affect the choice of these transmission parameters.

The tools for mitigating burst noise are generally the same ones used for impulse noise. Spreading provides good immunity to long bursts of noise. Reducing baud-rate can provide very strong immunity to very long burst noise even without spreading. However, given that long bursts (over 10 microsecond) are relatively rare, it may be better to transmit at high spectral efficiency with little coding overhead and sacrifice the occasional data packet instead of using a more robust mode with lower throughput. These are some of the trade-offs that the channel analysis function of the present invention, for example, in a DOCSIS 2.0 CMTS preferably considers when setting transmission parameters.

A common impairment is added white noise. Exemplary approaches for dealing with white noise are setting the constellation size based on SNR measured with the upstream spectral analysis or by observing soft and hard decisions. Reed Solomon coding parameters (RS word length and number of correctable bytes) are also preferably set according to the measured SNR. When the SNR is low, a DOCSIS 2.0 CMTS may choose also to reduce the number of active codes in S-CDMA mode, or equivalently, to reduce the baud rate in A-TDMA mode and to allocate higher spectral density to the reduced baud-rate signal. In both of these cases, modems can operate at very low SNRs.

A greater challenge for the DOCSIS 2.0 CMTS is when it is faced with the task of mitigating different types of noise simultaneously, especially when the optimal choice of parameters for each impairment are very different. For example, when ingress is combined with burst noise, the DOCSIS 2.0 CMTS needs to choose between a higher baud-rate that will improve the performance of the ingress cancellation, or a lower baud rate for greater immunity to long bursts. It needs to decide whether spreading will be used, providing greater immunity to bursts, but at the same time making ingress cancellation more difficult. Analyzing the mix of impairments, understanding the trade-offs and selecting the compromise set of parameters, which will provide optimal robustness to the measured impairment, while at the same time maximizing throughput, is a role of the parameter decision function of the present invention that may be implemented in a DOCSIS 2.0.

DOCSIS 2.0 gives cable operators a multitude of transmission parameters to define, such as modulation type (A-TDMA or S-CDMA), constellation, baud-rate, transmission power, preamble length and type, center frequency, error correction capability, interleaver parameters, spreader parameters and number of active codes in S-CDMA mode. Maximal channel throughput can be achieved by using mechanisms that optimally track and analyze the varying channel conditions and set the transmission parameters for optimal performance. The present invention provides methods and systems for optimal use of the many tools provided by standards such as DOCSIS 2.0. In an embodiment, DUCA is a functional block in a DOCSIS 2.0 CMTS dedicated to upstream channel measurement and analysis and optimal parameter selection. DUCA may perform time-domain and frequency-domain analysis, as described herein, and dynamically set transmission parameters for optimal use of the upstream channel. As data traffic increases, the channel analysis and optimal selection of parameters as provided in the present invention become even more important to realize the full potential of channels.

As mentioned above, the cable upstream channel suffers from various impairments such as impulse, burst, ingress and white gaussian noises. In order to achieve maximal throughput the upstream standard (e.g., DOCSIS 2.0) gives substantial flexibility to the Multiple System Operators (MSOs) to combat those impairments. This flexibility includes the ability to choose the type of transmission used (A-TDMA or S-CDMA), Baud-rate, constellation type used, variable forward error correction (FEC) capabilities, transmission power, preamble length and type and interleaving capabilities. Extra flexibility may be added using various Texas Instruments inventions, which include characterization of INCA™ (see copending patent application Ser. Nos. 09/392,598 and 09/302,872 incorporated herein by reference) split-preamble (see copending patent application Ser. No. 09/858,116 incorporated herein by reference) and other internal variables. The ability to reliably identify and analyze the channel impairments is required. Otherwise, a "worst case" scenario is taken resulting in inefficient use of standard capabilities and channel capacity. The Digital Upstream Channel Analyzer (DUCA), described as an embodiment of the present invention herein, provides a fully automated tool that allows the MSOs to maximize total upstream data throughput.

A general block diagram of an embodiment of the DUCA concept of the present invention is shown in FIG. 1. In an embodiment, DUCA 10 includes two main hierarchies 12,14. The first involves impairments characterization also referred to as low level analysis 12. Various embodiments are provided herein that describe modules to characterize the impairments that affect the channel. It includes frequency domain analysis (for characterization, for example, of ingress and white gaussian noise (WGN)) and time domain analysis (for characterization, for example, of burst, impulse, white gaussian noise and other impairments). Analysis is performed based on the actual received upstream signal based on dedicated hardware (HW) hooks integrated within the receiver. The analysis performed is able to take into account the actual receiver capabilities. While the analyses described herein are primarily presented in the context of applicability to the A-TDMA standard, various other embodiments of the present invention that would be applicable to other relevant standards, such as S-CDMA, will be apparent to persons skilled in the art upon reference to the descriptions provided herein.

The second main hierarchy 14 of DUCA 10 involves analysis and recommendations also referred to as high or top level analysis. Various embodiments are provided herein that describe modules to receive as an input the impairments characterization 30 obtained by the low-level analysis as well as out of band information (OOB) 28, such as required packet error rate, required throughput etc. Some of those tools are determined in the DOCSIS standard in what is called a "burst profile". This section processes the input data 28, 30 resulting in recommended burst parameters 34 for throughput maximization.

Figure 2:
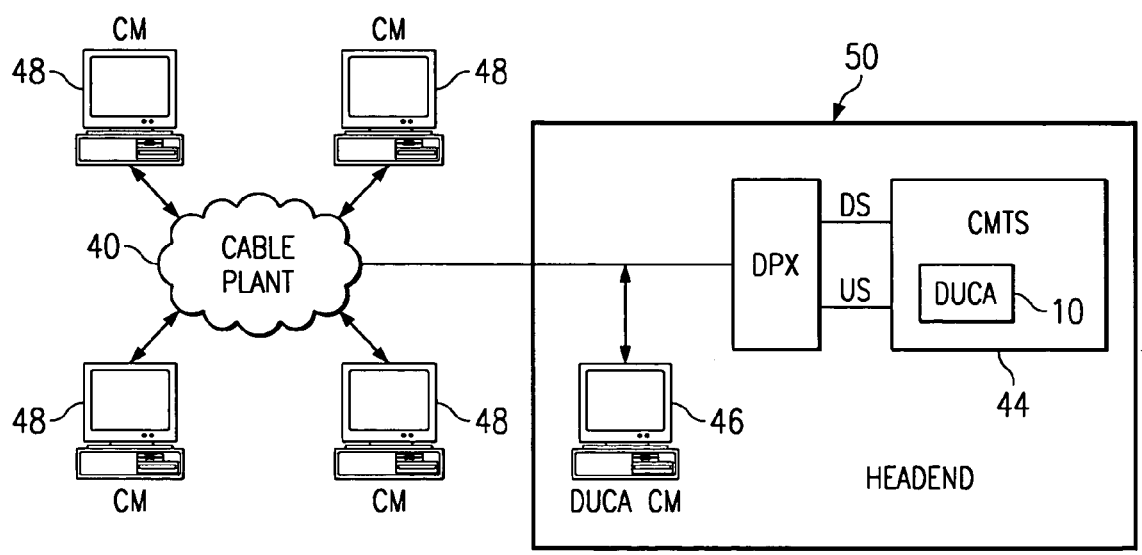
FIG. 2 is a system diagram of an embodiment of the present invention.

The overall system concept of the cable plant 40 including DUCA 10 is shown in FIG. 2. In an embodiment, the DUCA 10 is a part of the CMTS 44 solution. Its input is the upstream band and its output is characterizations and recommendations for upstream optimization. An optional upstream transmitter 46 ("DUCA CM") may be added so that upstream burst profiles can be easily controlled.

Figure 3:
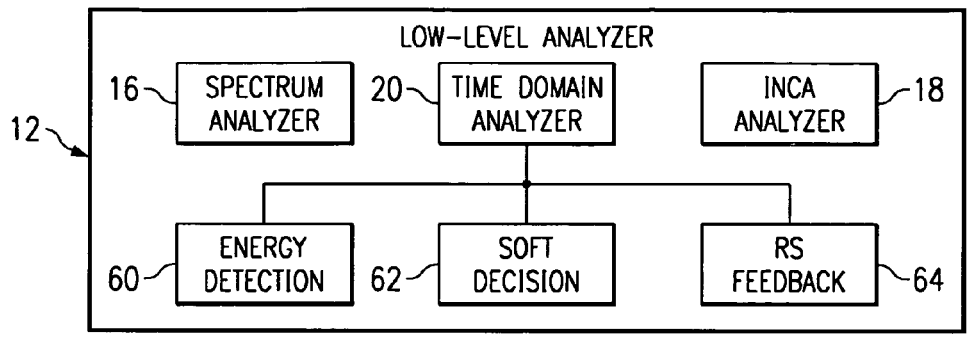
FIG. 3 is an exemplary implementation of a low level analyzer of the present invention.

The low-level analyzer 12 preferably includes HW hooks integrated within the receiver. They are used to identify and characterize the channel impairments. This information is passed to the high-level analyzer 14 for further processing. The outcome is burst profile recommendations 34 and internal parameters tuning to achieve maximal channel throughput for a given packet error rate requirement. In an embodiment, the low-level analysis 12 may perform three major analyses, as shown in FIG. 3.

In a first analysis, the spectrum analyzer 16 estimates the spectrum of the input signal. It may include the following properties. Spectral estimation may be done using Fast Fourier Transform (FFT) or other spectral estimation techniques. Spectral estimation may be implemented directly upon an analog to digital (A2D) output resulting in spectral analysis of the full upstream band. Alternatively, spectral estimation may also be implemented on a decimated input signal. The A2D 72 output signal may be decimated using one or more decimating filters, which may be included in the digital front end 74 of the receiver 54. Alternatively, a dedicated digital front end 104 may be added to the implementation in order to provide the ability to periodically scan the upstream band and implement the FFT algorithm only on part of the upstream band each time. This may reduce the required FFT size. For example, assuming the decimated signal occupies 1/X of the frequency range of the signal at the A2D output. We can implement a FFT which is X times smaller than the one required upon the A2D output and still achieve the same spectral resolution. The FFT input may be a decimated signal after variable decimating stages thereby achieving a tradeoff between scanning time and spectral resolution. In order to reduce estimation variance, known spectral estimation methods, such as Periodogram spectral estimation, Welch spectral estimation etc, can be used. A shaping window may multiply the input signal in order to achieve required spectral analysis properties.

Figure 4:
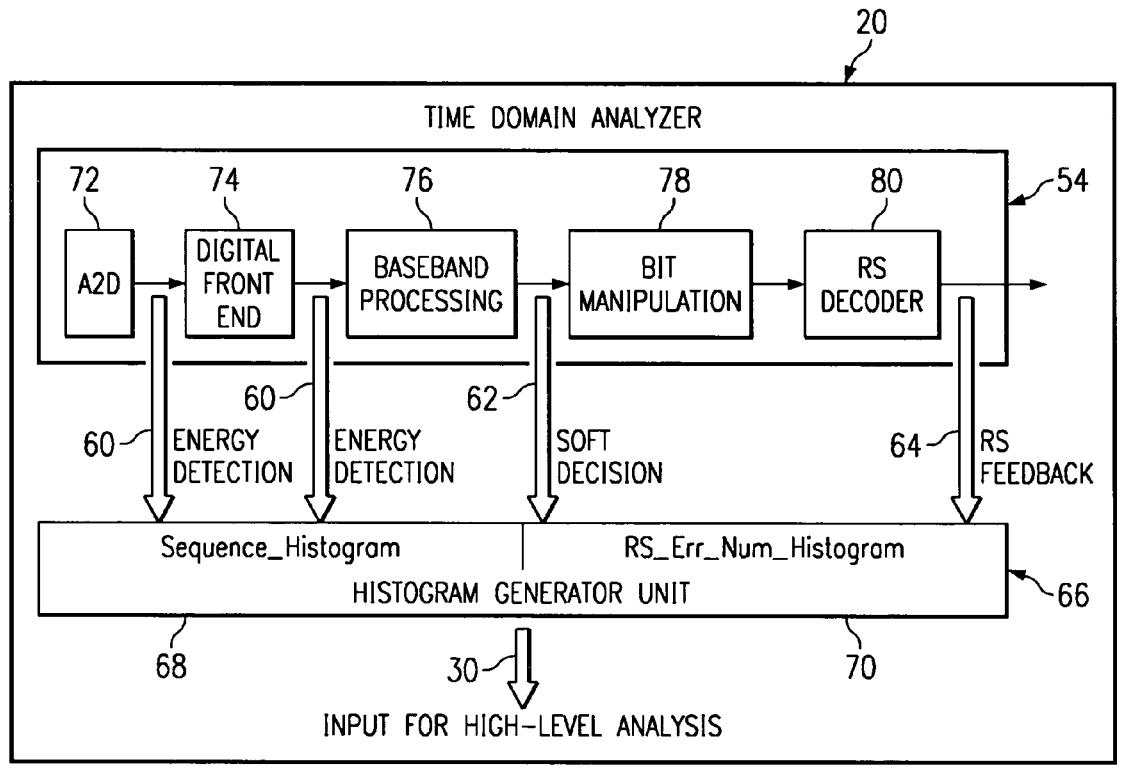
FIG. 4 is an exemplary implementation of a time domain analyzer of the present invention.

In an embodiment, the time domain analyzer 20 may characterize various channel impairments such as impulse, burst and white gaussian noises. Exemplary methods are shown in FIG. 3 and FIG. 4. The output of each method may be a binary vector estimating which of the input symbols (Energy detection 60/soft decision 62 methods) or bytes (RS feedback 64) is erred/suspected of being erred. Another output is the signal power level estimation 60 at various locations of the data flow. This vector may be fed to the histogram generator unit 66 for additional processing before data is passed to the high-level analysis 14, as explained below. FIG. 4 shows a block diagram of the time-domain analyzer 20. A typical structure of a receiver 54 is depicted showing relevant inputs for each exemplary time domain analyzer 20 method.

The energy detection method 60 identifies impulse and burst noise events by inspecting an input signal's energy as a function of the time. It can be implemented using different input signals from the A2D 72 output and from various stages of the digital front-end 74. This results in high flexibility regarding types of noises identified. The energy detection method is described in more detail below.

The soft decision method 62 characterizes channel impairments effects on the achievable throughput by analyzing the noise added by the channel. The noise characterized may be white gaussian noise (WGN), impulse noise, burst noise, ingress noise or any other impairment affecting current received signal. The noise is estimated by subtracting the slicer input signal (which includes transmitted symbol+noise) from the slicer output signal (which includes only the transmitted symbol, assuming no slicing errors occurred). The soft decision method is described in more detail below and in FIGS. 9, 10 and 11.

The RS feedback method 64 is another analysis that the low-level analysis 12 may employ. The RS feedback method 64 characterizes channel impairments effects on the achievable throughput by analyzing feedback received from the decoder 80 of the Reed Solomon (RS) code (a widely used block code that is used in the DOCSIS standard as well). It uses the decoder's 80 ability to specify for each decoded RS symbol (in the DOCSIS upstream case it is a byte) whether it was: 1) erred and corrected, 2) non-erred or 3) unknown. This method may also provide real-time information regarding achieved RS frame error rate. This can be used by the high-level analyzer 14 to verify that the required quality of service (QoS) requirements is met. In some standards, such as in DOCSIS 2.0, a byte de-interleaver, which may be included in bit manipulation block 78, is used prior to the RS decoder. The RS feedback may take the interleaver effect into consideration when performing its analysis. The RS feedback method 64 is described in more detail below.

All three methods described above result in unified binary output estimating which of the input symbols (Energy detection 60/soft decision 62 methods) or bytes (RS feedback method 64) are erred/suspected of being erred. These results are used by the histogram generator unit 66, shown in FIG. 4 and described below.

Figure 17:
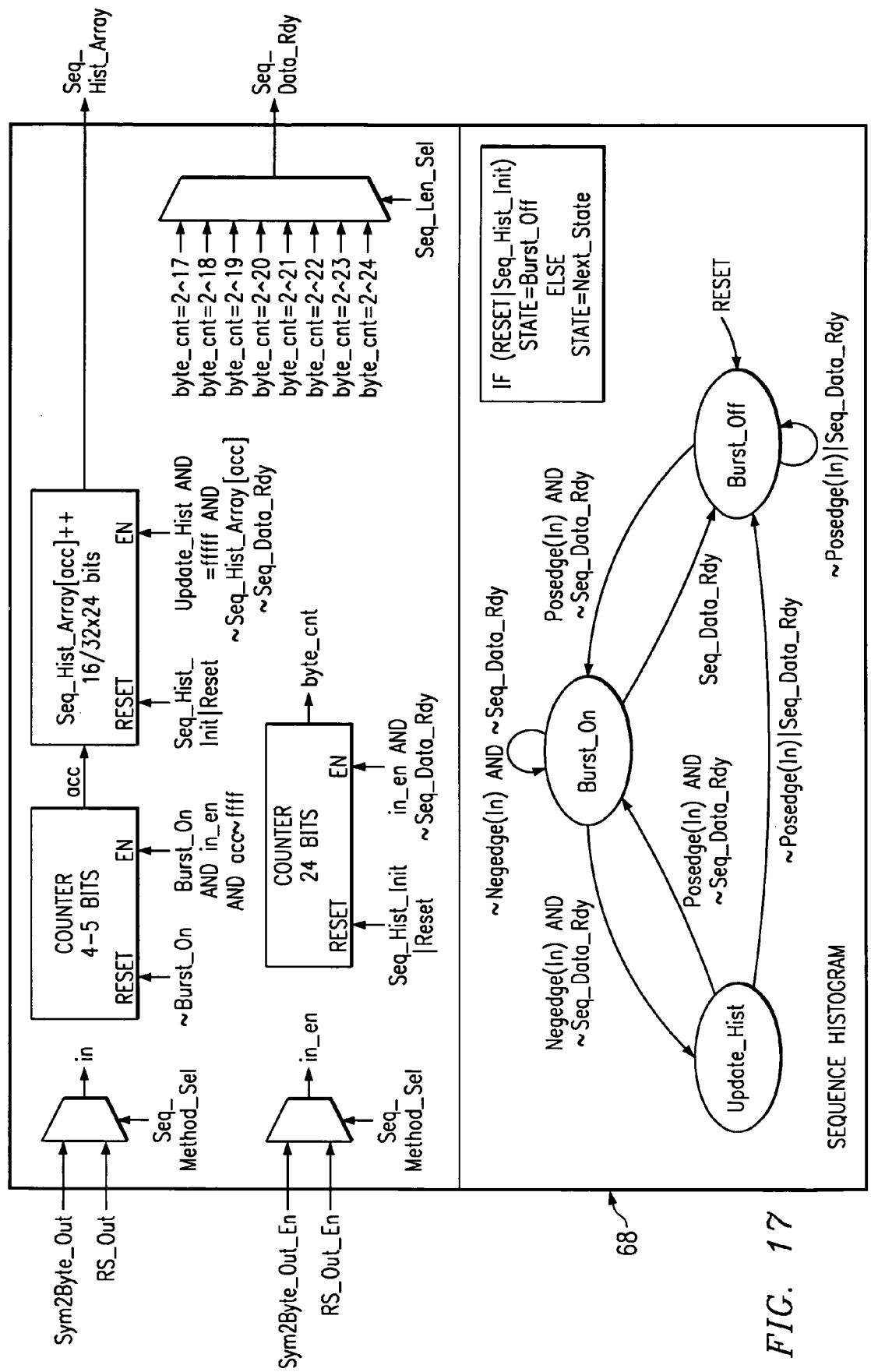
FIG. 17 is a block diagram and state machine of an exemplary implementation of a sequence histogram of the present invention.

The sequence_histogram 68 (also referred to as sequence of errors histogram), an exemplary implementation of which is shown in FIG. 17, preferably uses as its input the binary vectors, generated as mentioned above, and builds a histogram counting the number of error events with 1, 2, . . . N sequential errors. The high-level analyzer 14 uses this in order to estimate the achievable maximal channel throughput that still meets the required performance. The sequence of errors histogram 68 is described in more detail below and in FIG. 17.

The DOCSIS standard gives the user a large flexibility regarding the RS code used. It can use variable RS frame length and variable correcting abilities. It allows substantial flexibility and tradeoff between robustness and achieved coding rate. The RS_err_num_histogram 70 (also called RS number of errors histogram) is a method allowing estimation of the best achievable channel throughput while maintaining the required performance. This can be done without changing the actual burst profile used (i.e. without actual "trial and error" technique). The number of errors histogram 70 is described in more detail below.

In some standards, such as in DOCSIS 2.0, a Byte interleaver/de-interleaver effect may be used. A byte interleaver is used prior to the RS decoder in order to enhance robustness to impulse and burst noises. The RS_err_num_histogram 70 calculation may take interleaver effects into consideration. This is described in more detail below and in FIG. 14.

The time-domain analyzer methods described above can be used for erasures of symbols affected by the impairment identified when error control codes are used (such as convolutional/RS codes).

Ingress noise, which is characterized as narrow band interference, is a major impairment in various communications systems. INCA is an approach that may be used for cancellation of ingress noise in cable plants upstream transmissions. It may be implemented during the actual burst reception. The INCA analyzer 18 provides a method to estimate burst receiver INCA capabilities of a specific channel prior to the actual channel allocation and data transmission. This can be used for smart allocation of new channels and reallocation of already used channels. The INCA analyzer 18 is described in more detail below.

In an embodiment of the present invention, the DUCA high-level analyzer 14 analyzes and characterizes the channel impairments and generates transmission recommendations 34 in order to achieve maximal channel throughput. Inputs are the impairment characterizations 30 obtained by the low-level analyzer 12 as well as out of band information (OOB) 28, such as required packet error rate, required throughput etc. An embodiment of the DUCA high-level analyzer 14 includes three modes of operation: Channel monitoring 26, Channel allocation 24 and re-allocation 25; and spectrum manager 22. Preferably, the DUCA high-level analyzer 14 can perform different analysis for different types of transmitted data. For example: short bursts and long bursts.

The channel allocation 24 concept is used to optimally allocate new channels of the cable upstream band. It uses as input feedbacks obtained from the INCA analyzer 18. This feedback allows channel allocation 24 to know what the receiver's achieved performance would be should a specific channel be allocated. According to this information, an embodiment of the present invention allocates the required channels.

In an embodiment, the channel allocation 24 includes the following steps: 1) Scan the upstream frequency range according to all relevant frequencies, constellation types, baud-rates and other parameters dictated by the MSO. 2) For each option described above, activate the INCA analyzer 18 and receive the residual signal to noise ratio (SNR) achieved, should this upstream band used. Each SNR can be directly translated to the constellation used. 3) After all information is obtained allocate the channels to employ. This embodiment defines relevant transmission parameters such as the channel carrier frequency, baud rate, signal power and constellation used and is described in more detail below. 4) After the required channels are allocated (and prior to actual data transmission) this approach defines the optimal parameters for this channel to use. Those parameters may include: carrier frequencies, baud rates, signals power, constellations used, interleavers properties, RS properties such as RS frame length (N) and correcting ability (t), preambles properties such as length and sequence used, and initialization of receiver internal capabilities to optimally receive the bursts after the channel is allocated. 5) The parameters defined above can be defined following the next steps: a) For each allocated channel: re-activate the INCA analyzer 18 using the carrier frequency, baud rate, and constellation used chosen. b) Pass the INCA analyzer 18 output signal to the soft decision method 62. This method is used to identify the noise samples stronger then $D_{min}/2$ (in absolute value) of the chosen constellation where $D_{min}$ is the minimum distance between constellation points. Each of the noise samples would generate an erred symbol. The result is a binary vector estimating (even before actual data transmission is performed) what the symbol error statistics would be when actual data is transmitted. The energy detection method 60 may be use as well. c) Use the binary vector to generate an RS_err_num_histogram 70 and perform the same analysis as described in "channel monitoring" 26 high-level mode described below. This may allow optimal definition of the rest of the parameters defined above.

An active channel is constantly subject to impairment changes. In some cases, impairments that affect the channel may change in such a way that higher throughput can be achieved if the channel carrier frequency is changed. This is called "channel re-allocation". The approach used for channel re-allocation 25 is similar to channel allocation 24, with one exception. Since the approach described above assumes there is no transmission in the scanned frequencies (and therefore what is received is pure noise) channel re-allocation 25 using frequency bands that are used by the channel to reallocate can be implemented only during time periods when the channel to be reallocated has no active transmission. In an embodiment, this can be implemented by adding a dedicated mechanism within the receiver to identify the time periods without transmission, or by information received from higher levels, such as the media access controller (MAC). In an embodiment, channel allocation 24 is based on the INCA analyzer 18 and is used when no actual transmission occurs on a specific central frequency-baud rate combination. In an embodiment for channel reallocation 25, to achieve increased throughput different carrier frequencies are considered other than the one already used. In considering moving to unoccupied frequencies the INCA analyzer 18 may be employed as described above. In an embodiment considering occupied frequencies a different approach may be used. For example, assume in frequencies 10-20 Mhz only one channel is used and current transmission is employing frequencies of 12-18.4 Mhz. In this example, shifting to frequencies of 11-17.4 is considered. It is desirable to consider the shift in frequencies without disrupting current transmission. In an embodiment, activating the INCA analyzer 18 is based on checking frequencies without transmission. Therefore, activating INCA analyzer 18 to check possible achieved throughput in 11-17.4 Mhz band may be performed during time periods without active transmission in the current used channel. In an embodiment, this can be implemented by adding a dedicated mechanism within the receiver to identify the time periods without transmission, or by information received from higher levels, such as the media access controller (MAC).

The spectrum manager 22 uses the spectrum estimation received from the spectrum analyzer 16. It may direct the spectrum analyzer 16 to average the received data over a certain period to time or hold the maximal value received ("Max-hold"). This information can be used, for example, to implement the following: identification of ingress noise locations, estimation of ingress noise power and estimation of white gaussian noise (WGN) power. The spectrum manager 22 can collect statistics from different periods of the day in order to identify common noise patterns throughout the day.

Other exemplary features and embodiments of the present invention are provided below. For example, DUCA tools to identify time periods with high impairment level are described above. It can also activate a mechanism that would encapsulate signal samples during those moments and use them for further non-regular processing in dedicated hardware such as a digital signal processor (DSP). This processing can implement further analysis of the noise characteristics or even implement better reception algorithms in order to enhance robustness.

DUCA, for example, may also be used as an automatic tool for CM 48 installation at the client home. It can give automatic feedback to a test tone transmitted by the technician installing the CM 48. Additionally, high-level analysis can be implemented using a processor (internal or external) to provide increased flexibility.

Moreover, for each received burst the achieved performance at the end of the burst can be compared to the one achieved at the beginning of each burst. Substantial differences may suggest that the channel is impaired (and hence initial burst parameters are not estimated correctly). The DUCA can suggest increased preamble length to accommodate that problem.

DUCA can also be used for monitoring of non-DOCSIS signals behavior and maintaining power control of these signals.

Many communication systems suffer from varying and dynamic impairments that may change dramatically over time. Many standards, such as cable upstream communication using the DOCSIS standard, give multiple tools to combat those impairments. Among the tools provided may be the type of constellation used, variable forward error correction (FEC) capabilities, transmission power, preamble length etc.

Channel monitoring 26 is the high-level analysis 14 mode that maximizes throughput of an active channel. The purpose of this mode is to track changes in channel impairment characterizations and accordingly adapt relevant burst profile parameters. That way DUCA can allow MSOs to avoid the current situation, where QPSK (the most basic constellation) and substantial FEC overhead are used to accommodate the worst-case scenario and hence dramatically reduce channel throughput. The relevant low-level analysis inputs 30 for this mode may be, for example, from all three low-level analysis tools 12.

The channel monitoring 26 mode can use channel reallocation 25 feedbacks in order to verify if higher throughput can be achieved if the current upstream channel is replaced by a new one. In an embodiment of the present invention, what parameters this channel should use in order to maximize achieved throughput are defined. The parameters defined may include: signal power, constellation used, interleaver properties, RS properties: RS word length (N) and correcting ability (t), preamble properties: length, power and sequence used, carrier frequency, baud rate, and initialization of receiver 54 internal capabilities to optimally receive the bursts after the channel is allocated. The channel monitoring 26 can collect statistics from different periods of the day in order to identify common noise patterns throughout the day. The statistics collected can also be averaged over longer periods of time. This embodiment is described in more detail below.

The channel monitoring 26 mode may include, for example, four approaches. First, channel throughput maximization may be realized using the current constellation. This approach uses low-level analysis feedbacks 30 described in more detail below. Second, channel throughput maximization may be achieved while considering the usage of a higher constellation. A higher constellation means a constellation that allows transmission of more bits per symbol. This approach uses, for example, low-level analysis feedbacks 30 described herein. Third, channel throughput maximization may be realized while considering the usage of a lower constellation. A lower constellation means a constellation that allows transmission of less bits per symbol. This routine may use low-level analysis feedbacks 30 described herein. The fourth approach is current burst monitoring. This approach assures that current burst profile achieves the required quality of service (QoS), such as achieving required packet error rate, etc.

Channel throughput maximization using current constellation uses, for example, RS parameters such as t and N. In general, RS is a block code of length N symbols with K information symbols and 2t parity symbols where N=K+2t. That code has the ability to correct up to t erred symbols per block. The code rate is defined as K/N. This method uses low-level analysis feedbacks 30 described below to characterize the errors statistics of the current constellation used. This may be used to optimally configure FEC parameters, as well as others (such as interleaver parameters, preamble parameters, etc). The consideration of different FEC parameters (t, N) may be considered virtually, without actually changing the used burst profile.

The approach may include the steps as follows. First, for a given N (virtual RS word size) and interleaver depth: activate the low-level time-domain analyzer 20. Receive low-level analysis results 30 such as RS number of errors histogram 70, sequence of errors histogram 68, achieved frame error rate (FER) and achieved rate. This step is described in more detail below.

An implementation may include repeating the first stage for each possible N. This is generally called a simple sequential search. A better approach may perform, for example, a regular binary search or an interleaver based binary search. In a regular binary search, assuming the dominant channel impairment is white gaussian noise (WGN) and the burst and impulse noise has only second order effect. It can be shown that maximal channel throughput is achieved if we use the maximal RS word size (N) even at the expense of using the maximal possible RS correcting ability (maximal t). As a result the binary search looks for the maximal RS word size (N) that still achieves the required RS frame error rate target (Fer_Target).

An example for implementation of this approach can be the following:

```
N_low=minimal allowed RS word size.
N_high=maximal allowed RS word size.
go=1
While (go){
    N=(N_low+N_high)/2
    Activate low-level analysis with parameters N, Fer_Target, t_Max
    Get histograms, Rate, FER.
    If (FER< Fer_Target)
        N_low=N
    Else
        N_high=N
    If N_high=N_low+1
        go=0
}
```

Outcome: The recommended N is the highest one to fulfill the condition FER<FER_Target.

Turning to an interleaver based binary search, DOCSIS 2.0 standard may allow the use of rectangular interleaver an example of which is shown in FIG. 12. The rectangular interleaver is a memory array built of D rows and N columns. Input data is entered, for example, row-by-row and output, for example, column by column. The interleaver, for example, enters the data column by column and outputs row-by-row to reverse the interleaver effect. The interleaver is used to combat impulse/burst noises since the process described above separates K sequential erred symbols to K distinct erred symbols, separated by D-1 non-erred symbols as shown in the example of FIG. 13. This is useful when a RS code is employed. The dimension N of the rectangular interleaver (number of columns in this example) is set to be equal the RS word length.

If an interleaver is employed, one binary search on all possible N may not be enough. If the channel is dominated by long burst or impulse noises there may be cases where using short N results in a higher interleaver depth that provides higher immunity to the long impulse noise. That way higher throughput can be achieved. Therefore, all or some of the possible interleaver depths may be explored and in each interleaver depth a binary search may be implemented, as described above. The best throughput achieved from all scanned interleaver depths is used. For example, assuming the total allowed interleaver size is 300 bytes and we want to consider interleaver depths of 2-5. This results in the options shown in Table 1.

TABLE 1

| Interleaver depth | Minimal possible N | Maximal possible N |
|---|---|---|
| 2 | 101 | 150 |
| 3 | 76 | 100 |
| 4 | 61 | 75 |
| 5 | 51 | 60 |

As a result the binary search described above would be activated 4 times using the minimal and maximal possible N. The parameters that achieve the best throughput would be recommended. The recommendation would also include permeable length and type optimization according to impairment characterizations of the channel. Different recommendations would be generated for long and short bursts.

The decision of what method to use (binary search, interleaver based binary search, simple sequential search or any other kind of search) may be based on the sequence of errors histogram 68 (which shows the characterization of the channel burst and impulse noises), on real time processing issues or any other applicable approach.

Another approach is channel throughput maximization using a higher constellation. In some cases using a higher order constellation (a constellation with more bits per symbol and hence with higher throughput) at the expense of using stronger RS code (and hence with lower code rate reducing channel throughput) would result in higher channel throughput and hence would be generally preferable. This approach estimates what would be the achieved channel throughput if a higher constellation were used. The estimation is performed while the current burst profile remains unchanged, i.e. the lower constellation is still used. The input for this approach is preferably the low-level analysis feedbacks 30 described in more detail below.

Figure 18:
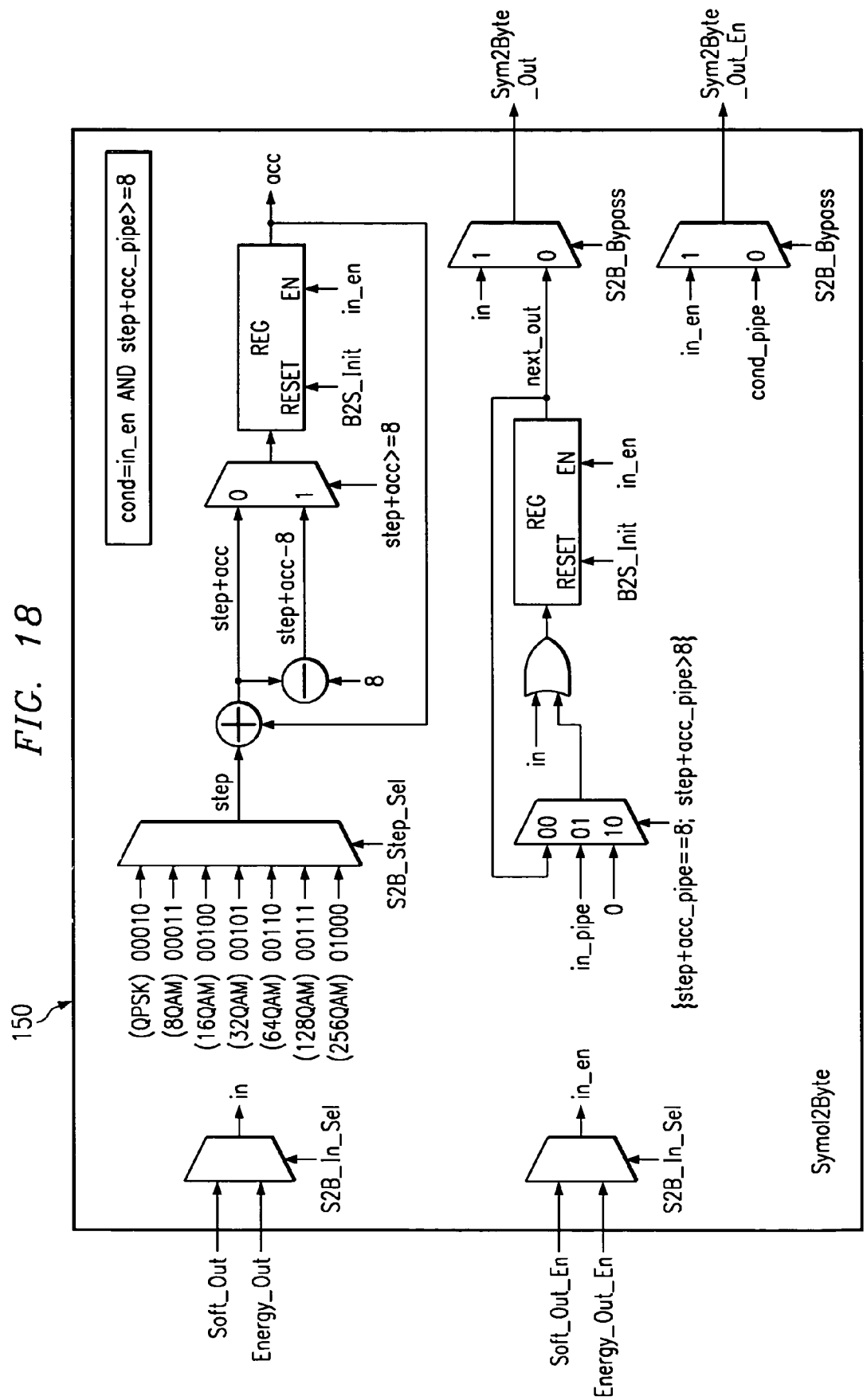
FIG. 18 is an exemplary implementation of a Symbol2Byte module of the present invention.

An example for implementation of this approach is as follows. First, preferably activate the soft-decision low-level module 62 described in more detail below. This results in a binary vectors where 1/0 means "this symbol is/is not suspected of being erred should the higher constellation be used", respectively. Second, burst and impulse noise characterization of the estimated channel can be achieved by generating the sequence of errors histogram 68, as described in more detail below. Third, this method results in a vector of erred symbols and not in a vector of erred bytes. In order to estimate the RS effect (performed upon bytes) the following blocks may be used: A symbol→byte module 150 may be used, as described in more detail below and in FIG. 18. The outcome is a binary vector estimating what bytes would be erred should the higher constellation be used. This binary vector is considered as if it was an output of the RS decoder 80 and is used to generate the number of errors histogram 70 described in more detail below. The histogram 70 may be generated with or without taking into account the effect of an interleaver, as explained in more detail below. These first three steps may be repeated using different possible RS word size (N). The search for the best N can be a binary search or an interleaver based binary search, a simple sequential search or any other search.

An additional approach is channel throughput maximization using a lower constellation. In some cases using a lower order constellation (a constellation with less bits per symbol and hence with lower throughput) at the expense of using weaker RS code (and hence with higher code rate) would result in higher channel throughput. This approach allows estimating what would be the achieved channel throughput if a lower constellation were used. The estimation is performed while the current burst profile remains unchanged, i.e. the higher constellation is still used.

An example for implementation of this approach is as follows. First, preferably activate a low-level analysis such as the energy detection 60 or soft decision 62 methods described in more detail below. This results in binary vectors where 1/0 means "this symbol is/is not suspected of being erred should the lower constellation be used", respectively. Because the soft decision approach 62 is generally effective only while evaluating higher order constellations while here evaluation of lower order constellations is desired two options are described. In the first option, statistics are calculated only during time without active transmission. That way the received signal includes only samples of the channel impairments. Then, the soft decision approach 62 is activated with the parameters On_Num=Off_Num=1 and TH_Up=TH_Down=$D_{min}/2$ of the required constellation. Turning to the second option, every burst begins with transmission of pre-defined symbols, called preamble sequence. In order to achieve high robustness for this important burst section it is usually transmitted using the lowest possible constellation, such as QPSK in the DOCSIS standard. If the soft decision approach 62 is only used during the preamble sequence, achievable throughput can be estimated for any required constellation, even for a lower order constellation.

Next, burst and impulse noise characterization of the estimated channel can be achieved by generating the sequence of errors histogram 68. Since this method results in a vector of erred symbols and not in a vector of erred bytes, In order to estimate the RS effect the following blocks are preferably used. A symbol→byte module 150 may be used. The outcome is a binary vector estimating what bytes would be erred should the lower constellation be used. This binary vector is used as if it was an output of the RS decoder 80 to generate the number of errors histogram 70. The histogram 70 may be generated with or without taking into account the effect of an interleaver, as explained further below. The above steps may be repeated using different possible RS word size (N). The search for the best N can be a binary search, an interleaver based binary search, a simple sequential search or any other search.

The current burst monitoring approach checks current transmitted burst statistics and validates that the actual achieved RS frame error rate is within certain boundaries compared to the required RS frame error rate (FER_Target). Otherwise, the module may activate one of the procedures described above or directly initiate a burst profile parameters change in order to meet the required performance and to maximize achieved throughput.

The sequence of errors histogram 68 may be used to characterize the impulse and burst noise effect of the channel. An example of the use of this histogram 68 may be to define the maximal interleaver depth to use during an interleaver based binary search.

Estimation of the initial operating region may also be addressed. The channel throughput maximization approaches described above involve estimation of achievable channel throughput using actual received data. In some cases there may be real-time constraints because there may be a need to wait a substantial amount of time (even a few seconds) before a statistically adequate amount of data is received. Those real-time constraints may allow only limited number of RS parameters to be evaluated. The following approach evaluates an initial operating region in order to eliminate the number of RS scenarios that need to be checked.

Assuming erred bytes are identically independent distributed (IID) with probability P. This may be the case where white gaussian noise (WGN) is the dominant impairment or when adequate interleaving is used.

Random variable x is defined as:

$$X = \begin{cases} 1 & \text{(with probability } P\text{)} \quad \text{this byte is erred} \\ 0 & \text{(with probability } 1 - P\text{)} \quad \text{this byte is not erred} \end{cases}$$

X is a Bernoulli distributed:

$$X \sim \text{Bernoulli}(P, 1-P)$$

Random variable Y is defined as $$Y = \sum_{i=1}^{N} X_i.$$

Y is Binomial distributed $$Y \sim \text{Binomial}(NP, NP(1-P))$$

Y may represent the number of erred bytes within RS word of length N.

In an embodiment, a binomial distribution calculation may be used. This approach uses the distribution function of the number of erred bytes within a RS word of length N. This approach may be achieved as follows.

Assuming that dominant impairment is the white gaussian noise. The probability of byte error rate can be estimated by the following equation:

$$P = \frac{1}{N} * \sum_{i=1}^{Len} i * \text{Sequence of errors histogram}[i]$$

Where sequence of errors histogram 68 is the histogram generated as explained below, Len is number of entries in that histogram 68 and N is the total number of bytes (erred and not erred), which were used to generate the sequence of errors histogram 68 statistics. Note that the probability of byte error (P) can be estimated in any other way, such as estimation of SNR using signal spectrum, estimation of MSE using slicer inputs and outputs, etc.

If it is assumed that the dominant impairment is additive WGN, the error events are uncorrelated and therefore probability of RS frame error rate can be calculated as seen in the following equation:

$$\text{Frame\_Error\_Rate} = \sum_{t=T\_max+1}^{N} \binom{N}{t} P^t (1-P)^{N-t}$$

Where N is the RS word length, T_Max is the maximal correcting capability of the RS code and P is the estimated byte error rate.

Preferably, the intent is to find the maximal RS word length (N) that would still achieve the required frame error rate (i.e. maximal N to achieve Frame_Error_Rate<FER_Target). Because solving the equation for Frame_Error_Rate above is not a simple task, a binary search may be used. An approach for a binary search is as follows:

```
N_low=minimal allowed RS word size.
N_high=maximal allowed RS word size.
go=1
While (go){
    N=(N_low+N_high)/2
```

$$\text{Frame\_Error\_Rate} = \sum_{t=T\_max+1}^{N} \binom{N}{t} P^t (1-P)^{N-t}$$

```
    If (Frame_Error_Rate< Fer_Target)
        N_low=N
    Else
        N_high=N
    If N_high=N_low+1
        go=0
}
```

Outcome: N recommended is the highest one to fulfill the condition Frame_Error_Rate<FER_Target.

Note that this method differs from the one used for the channel throughput maximization approaches described above because in this method the calculations are theoretical while above the calculation is based on actual data received, often requiring substantially more time until enough data is received.

In order to save computational resources and since error event with T_Max+1 erred bytes is the dominant error event, the calculation above can be reduced to the following equation:

$$\text{Frame\_Error\_Rate} \approx \binom{N}{T\_max+1} P^{T\_max+1}(1-P)^{N-T\_max+1}$$

In another embodiment, a normal distribution approximation may be used. As discussed above, Y, representing the number of erred bytes within RS word of length N, has the following distribution function:

Y~Binomial(NP, NP(1−P))

For a large N and relatively large P (few percentages) Y can be approximated to a normal distribution:

Y~N(NP, NP(1−P))

Note that this approximation is not precise since a binomial distribution is non-negative while a normal distribution may be both positive and negative, but for large N and relatively large P this estimation can give a reasonable initial operating region.

Because the RS code is capable of correcting up to T_Max errors per RS frame, and the preference is to guarantee that the achieved frame error rate (FER) would be below a pre-defined value (FER_Target), it is desirable to find maximal N so that:

$$\boxed{Prob(Y > \text{T\_Max}) < \text{FER\_Target}}$$

A new random variable is defined as:

$$Y' = \frac{Y - NP}{\sqrt{NP(1-P)}} \Rightarrow Y' \sim N(0,1)$$

Y' is a well-tabulated random variable and hence for FER_Target it is possible to find N to fulfill the condition above. (Pr ob(Y>T_Max)<FER_Target). This involves solving the second degree equation, which requires lower computational resources then what is described above in the binomial distribution calculation approach. However, this method is generally best for large N and relative high probability of error P (few percentages) and generally provides an estimation with lower accuracy.

In another embodiment of the present invention a method and system for allocating frequency bands for QAM signals when the total number of QAM signals is limited, and in the presence of non-white noise is provided. A frequency band is provided that is wide enough to accommodate more than one QAM signal. The QAM signals' symbol rates must be chosen from a finite set of allowed symbol rates. (E.g. in DOCSIS 1.x upstream transmission, this set consists of 2.56M, 1.28M, 640K, 320K and 160K symbols per second. DOCSIS 2.0 also includes 5.12M.) Suppose also there is a maximum allowed number of QAM signals that can be used and a restriction on the total power of all transmissions combined. Suppose further that the noise spectrum of the channel is given (e.g., by the INCA analyzer 18 and the time-domain analyzer 20). The challenge is to determine the carrier frequencies and the baud rates of the QAM signals so as to maximize the total number of information bits per second of all the QAM signals.

The complexity in the approach of the present invention is linear rather than exponential. This means that the number of operations required for the frequency allocation depends linearly on the number of QAM signals and number of baud rates and is dramatically smaller then what it would be if all possible combinations of carrier frequencies and baud rates were checked. For example, if the number of columns in Table 2 is 600and the number of rows is 6, and the number of QAM signals is 6 then the number of possible frequency allocations is about 3e18, that is: 3,000,000,000,000,000,000. Comparing all these combinations is difficult if not impossible. The approach provided here does such an allocation much more quickly.

Figure 5:
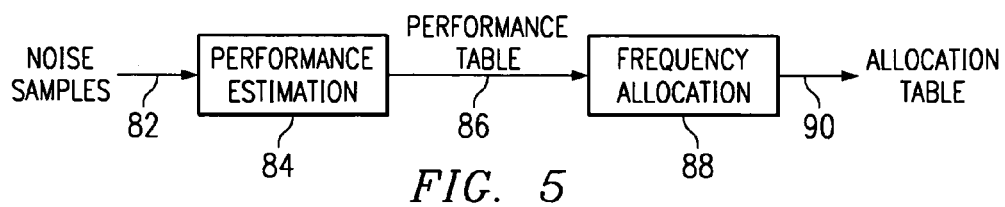
FIG. 5 is an exemplary implementation of the present invention for a system for allocating QAM signals.

An embodiment for channel allocation 24 and reallocation 25 may be seen in FIG. 5, which depicts a system for allocating QAM signals. Turning first to the performance estimation block 84, this block receives samples of the channel noise 82, with a sample frequency that equals or exceeds the Nyquist frequency. It is assumed that the noise is colored, possibly with some narrow band interference. The performance estimation block 84 receives a parameter, which sets the maximum allowed bit error rate (BER), for example, 1e-8. Then, the performance estimation block 84 scans through all possible combinations of a single carrier frequency and a single baud rate, and for each such pair, estimates what QAM constellation can be used, such that the actual BER will not exceed the maximum allowed. An example for such a table 86 is given in Table 2. As an example, Table 2 shows that if a QAM signal with baud rate of 1.28M symbols/sec and carrier frequency of 10.2 Mhz is used then with a constellation of 16 the BER will be smaller than 1e-8, and with a constellation higher than 16, the BER will be higher than 1e-8. Further detail of a method employed by the performance estimation block is described in more detail below.

TABLE 2

Example of performance table

| | | Carrier Frequency (Mhz) | | | | | | | |
|---|---|---|---|---|---|---|---|---|---|
| | | 10 | 10.1 | 10.2 | 10.3 | ... | 19.7 | 19.8 | 19.9 | 20 |
| Symbol rate | 160K | 64 | 32 | 4 | 16 | ... | 64 | 32 | 32 | 32 |
| | 320K | 32 | 32 | 4 | 4 | ... | 64 | 32 | 32 | 32 |
| | 640K | 32 | 32 | 4 | 4 | ... | 32 | 32 | 32 | 32 |
| | 1.28 M | 32 | 32 | 16 | 16 | ... | 16 | 32 | 32 | 32 |
| | 2.56 M | 32 | 32 | 16 | 16 | ... | 16 | 32 | 64 | 64 |
| | 5.12 M | 32 | 32 | 16 | 16 | ... | 16 | 32 | 64 | 64 |

The role of the frequency allocation block 88 is to allocate carrier frequencies and the baud rates of the QAM signals, so as to maximize the total number of information bits per second of all the QAM signals. The output 90 of this block 88 should be in the form of the example given in Table 3.

TABLE 3

Example of Channel allocation table for 5 QAM signals

| No. | Carrier freq | Mbaud | Constellation |
|---|---|---|---|
| 1 | 10 | 2.56 | 4 |
| 2 | 11.9 | 1.28 | 4 |
| 3 | 13.7 | 1.28 | 16 |
| 4 | 16.9 | 2.56 | 64 |
| 5 | 20 | 2.56 | 16 |

A method for the frequency allocation block 88 may be as follows. First, initialization is performed. A method for this step may include creating two lists. Each list contains all possible combinations of baud rate and constellation. List-A is sorted by the constellation size (from higher to lower). List-B is sorted by the data rate (from higher to lower), where data rate is the number of bits per second. That is: Data_rate=baud * Log2 (constellation). List A is optimal from the Spectral-Efficiency point of view (with no limitation on the number of receivers used) and List B is optimal in the total data-rate sense, while using a given number of receivers. The approach described above is optimal in the sense of total data-rate for a given number of channels to allocate. For example, suppose that the allowed symbol rates are 5.12M, 2.56M and 1.28M, and the allowed constellations are 4, 16 and 64. Then List A and List B are given below in Table 4.

TABLE 4

List A

| No. | Baud | Constellation |
|---|---|---|
| 1 | 5.12 M | 64 |
| 2 | 2.56 M | 64 |
| 3 | 1.28 M | 64 |
| 4 | 5.12 M | 16 |
| 5 | 2.56 M | 16 |
| 6 | 1.28 M | 16 |
| 7 | 5.12 M | 4 |
| 8 | 2.56 M | 4 |
| 9 | 1.28 M | 4 |

TABLE 4

List B

| No. | Baud | Constellation | Data rate |
|---|---|---|---|
| 1 | 5.12 M | 64 | 30.72 M |
| 2 | 5.12 M | 16 | 20.48 M |
| 3 | 2.56 M | 64 | 15.36 M |
| 4 | 2.56 M | 16 | 10.24 M |
| 5 | 5.12 M | 4 | 10.24 M |
| 6 | 1.28 M | 64 | 7.68 M |
| 7 | 1.28 M | 16 | 5.12 M |
| 8 | 2.56 M | 4 | 5.12 M |
| 9 | 1.28 M | 4 | 2.56 M |

Next, a method of allocation is provided:

```
N_Rx=5% max number of QAM signals
num_of_trials=100
for tt=1:num_of_trials
    selected_bauds1=zeros(200,20);
    selected_carriers1=zeros(200,20);
    selected_consts1=zeros(200,20);
    i=0; % i is the counter of the QAM signals that were successfully allocated.
    jd=1; % jd is a pointer to List-B
    js=1; % js is a pointer to List-A
    for j=1:2*length(List-A)
        if (i<N_Rx)
            generate a random bit rand_bit
            if (rand_bit=1)
                BAUD=baud from List-B, line number jd;
                CONSTELLATION= constellation from List-B, line number jd;
                jd=min(jd+1, length(List-B));
            else
                BAUD=baud from List-A, line number js;
                CONSTELLATION= constellation from List-A, line number js;
                js=min(js+1, length(List-A));
            endif
look_again:
            Look for an available frequency band, in which, according to Table 1,
it is possible to work with a QAM signal with BAUD and
CONSTELLATION. If success, set SUCCESS=1. Else, set SUCCESS=0.
            if (SUCCESS=1 & i<N_Rx)
                i=i+1;
                selected_carriers1(tt,i)=the carrier in which we had SUCCESS;
                selected_bauds1(tt,i)=BAUD;
                selected_consts1(tt,i)=CONSTELLATION;
                jump look_again;
            endif
        endif %(endif for I<N_Rx)
    end % j loop
    No_of_QAMs(tt)=i;
    total_data_rate(tt)=selected_bauds1(tt,1:i)*log2(selected_consts1(tt,1:i))';
end % tt loop
% from all the num_of_trials allocation, choose the one with the highest
total data rate.
[Y, I]=max(total_data_rate);
No_of_QAMs=No_of_QAMs(I);
```

```
selected_carriers=selected_carriers1(I,1:No_of_QAMs);
selected_bauds=selected_bauds1(I,1:No_of_QAMs);
selected_consts=selected_consts1(I,1:No_of_QAMs);
```

Ingress noise, which is characterized as narrow band interference, is a major impairment in various communications systems. As previously discussed, INCA is an approach allowing cancellation of ingress noise, for example, in cable plants upstream transmissions. It is preferably implemented during burst reception. In an embodiment of the present invention, a method and system to estimate burst receiver INCA capabilities of a specific channel prior to the actual channel allocation and data transmission are provided. This can be used for smart allocation of new channels and reallocation of already used channels. The INCA analyzer 18 output may be used for channel allocation 24 and re-allocation 25 described above.

A purpose of the INCA analyzer 18 is to estimate what performance would be achieved if the analyzed channel is used for cable upstream burst transmission. As a result, the input signal to the INCA analyzer block 18 is preferably similar to the signal at the input of the baseband processing 76 of the actual burst receiver 54. This is application dependent and may be achieved, for example, by employing a dedicated digital front end (DFE) 104. It may include down conversion, various decimating filters, matched filter and other signal processing blocks, as performed in the actual burst receiver 54. Since during channel allocation no actual data is transmitted, the resulting INCA analyzer 18 input signal includes only impairments added by the channel, including potential ingress noise. The INCA analyzer 18 preferably includes a predictor 106 activated on the dedicated digital front-end 104 output. With the presence of a highly correlated signal (such as ingress noise), the predictor 106 can predict and subtract the next interference sample. This results in ingress cancellation. The predictor coefficients 102 may be updated using a least mean square (LMS) 92 approach or any other applicable method. In order to accurately predict INCA effects in an actual receiver 54 the number of INCA analyzer predictor coefficients 102 and the number of bits used for fixed-point arithmetic are preferably similar to that employed in the actual receiver 54. The power of the residual noise is averaged resulting in estimation of the residual noise power the actual receiver 54 would address if the INCA method were used. This can be used for smart allocation 24 of new channels and reallocation 25 of already used channels as described in more detail above.

In other words, as an example, input data in channel samples includes only different noise sources when there is no active transmission. In that case, Input[N]=Ingress_Noise[n]+Rest_Of_Noise[n], where (n) means it is on time index n. The samples may then be input to a predictor 106 that can predict of the part of the noise with high correlation (such as Ingress_Noise) in the next sample. This results in Ingress_Noise_Estimation[n+1]. During the next time index, [n+1] subtract the new incoming signal (Ingress_Noise[n+1]+Rest_Of_Noise[n+1]) from the predicted one. The result: Residual_Noise[n+1]=Ingress_Noise[n+1]+Rest_Of_Noise [n+1]. Then, Ingress_Noise_Estimation [n+1]=(approximately) Rest_Of_Noise[n+1] resulting in ingress cancellation. Both the incoming signal and the Residual_Noise may be entered to energy calculation, or detector, units 120, 122 that calculate the energy of each. The output power of Residual_Noise may be used to predict the possible throughput that may be achieved if this central frequency-baud rate combination is used, while taking into consideration the receiver internal ingress cancellation capabilities.

Residual_Noise can be used to estimate the power of ingress noise that was cancelled. This process may be used in a continuous manner with samples entering the predictor 106 continuously and noise being cancelled continuously. Additionally, the process may be repeated for various combinations of carrier frequency and baud rate.

Figure 6:
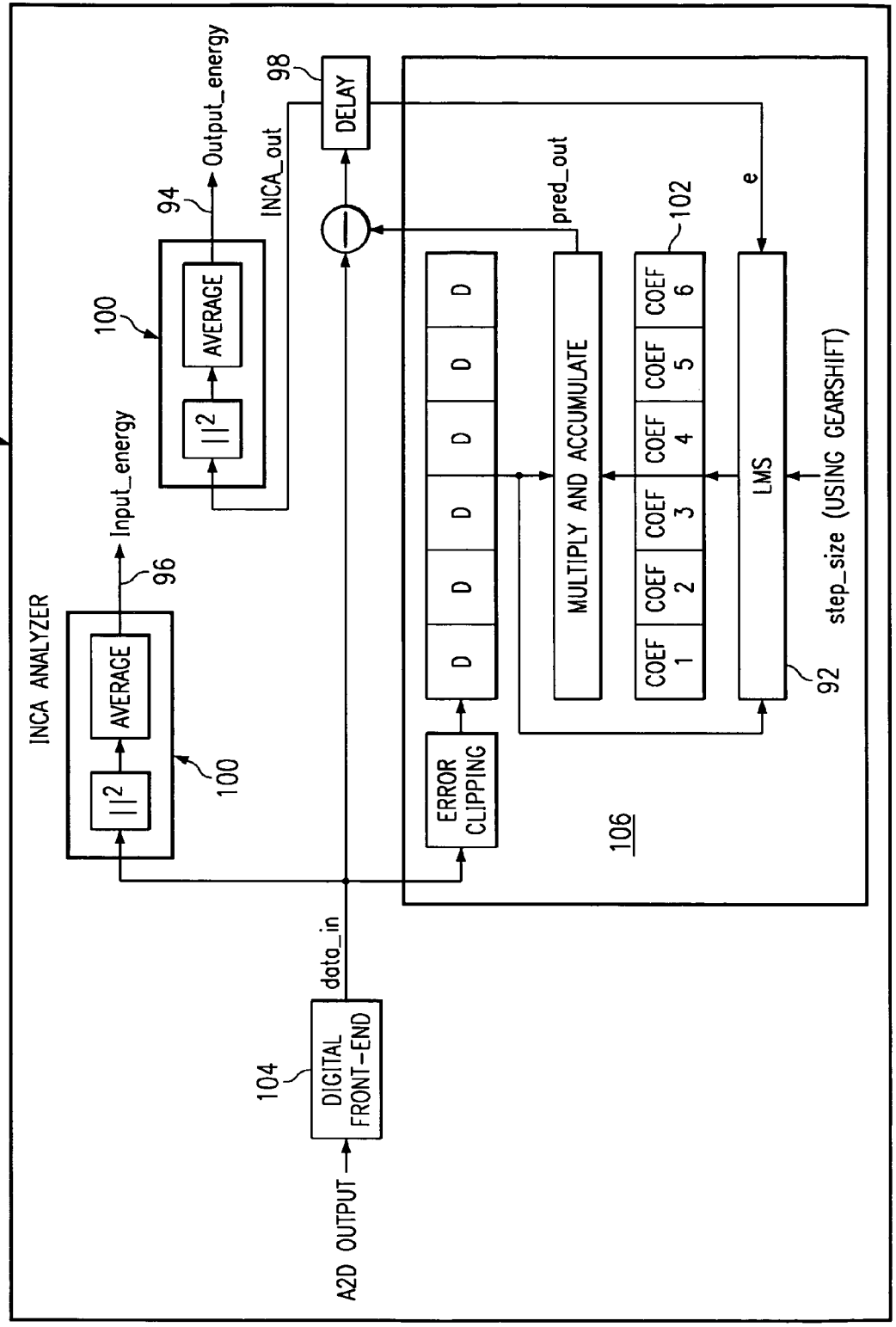
FIG. 6 is an exemplary implementation of an INCA analyzer of the present invention.

A block diagram of the approach described above can be seen in FIG. 6. In this example we assume that the predictor 106 has, for example, 6 taps. Note that the power difference between Output_energy 94 and Input_energy 96 can show an indication of the power of ingress canceled. The approach described above takes into consideration ingress noise analysis. In addition, one can add impulse and burst noise analysis before reaching the final decision regarding which baud rate and central frequency to employ. These impairment may be characterized using the time domain analyzer 20 and channel monitoring 26 methods, described herein. A few exemplary additions to the implementation are shown in FIG. 6 and described below.

Slicer errors may disrupt INCA adaptation when an actual burst is processed. In order to simulate slicer errors in the INCA analyzer the actual error used is preferably:

$$\text{Actual\_Error} = \begin{cases} \text{error} & |\text{real}(\text{error})| \,\&\, |\text{imag}(\text{error})| \leq \frac{d_{min}}{2} \\ -\text{sign}(\text{error})[d_{min} - /\text{error}/] & \text{o.w.} \end{cases}$$

(Where sign(error) = 0 if error = 0)

"Delay" block or unit 98: The error may be delayed by few a samples since delayed error is used in the actual receiver 54 due to HW processing delay.

Figure 7:
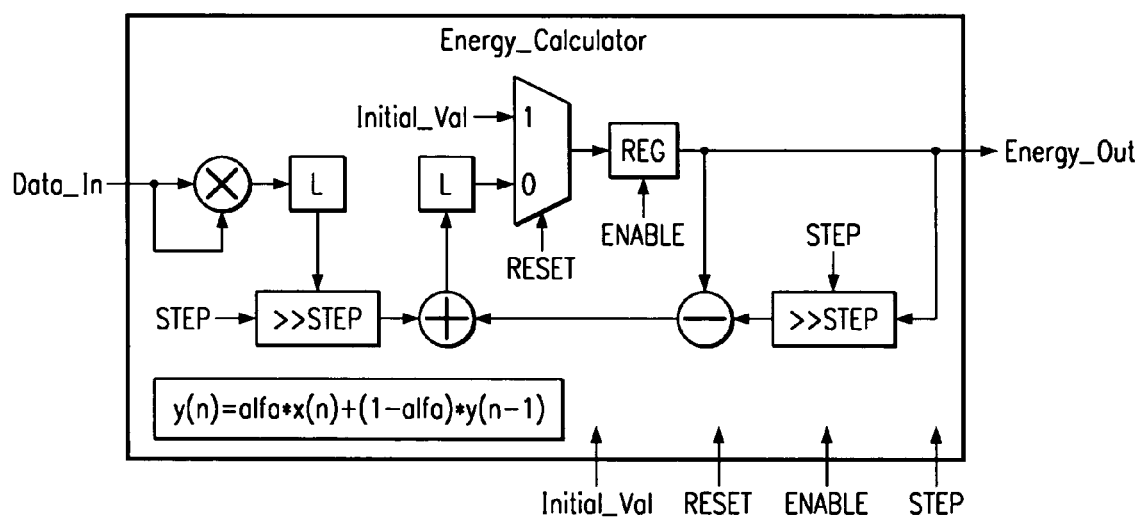
FIG. 7 is an exemplary implementation of an energy calculator of the present invention.

Average" blocks or units 100: These blocks generate the average power of the input data 96 and the output data 94. A suggestion for implementation of such a block can be seen in FIG. 7. FIG. 7 provides a simple HW implementation for an averaging filter based on a 1'st order Infinite Impulse Response (IIR) filter. The data averaged is data_in^2, which represents the signals power. An option to load the initial value is provided to avoid transition events before the filter converges to steady-state value. This method may be used to characterize impulse noise and the incoming data may be corrupted by burst and impulse noise as well. Comparing different baud rate and carrier frequencies combinations without removing the effect of impulse and burst noise may not be accurate since those impairments are not constantly active. Therefore, an option is to avoid activating the averaging filters during time periods where the burst and impulse impairments are active. An indication for that can be achieved from the energy detection method 60 described below.

The predictor coefficients 102, after convergence, can give information regarding estimated error propagation should the actual receiver 54 be used. They can provide frequency-domain estimation of the ingress by analyzing the frequency response of the predictor.

In an embodiment, residual ingress noise (after activating INCA analyzer 18 predictor) is referred to as WGN. DUCA may also be used to analyze if the INCA analyzer 18 output includes residual ingress noise. This can be done by training a more optimal predictor (with more taps), subtracting the outputs and calculating residual energy. A more optimal predictor is generally considered a larger predictor with more taps. Theoretically, an infinite-length predictor ("optimal") would cancel the ingress totally and therefore the difference between its output and the suggested predictor would give an indication if the residual noise is white or still has ingress properties.

Impulse and burst noises, which are characterized as strong noise over short periods of time, are major impairments in various communications systems. Proper identification and characterization of those impairments is important in order to fully exploit channel capacity. Hence, in an embodiment of the present invention, a method and system to identify and characterize impulse and burst noises added to a channel by measuring input signal energy is provided.

This approach preferably searches for impulse and burst noise by searching for peaks in signal's energy. In an embodiment, the following approach may be employed. The mean (="slow") and local or recent (="fast") energy of the input signal may be calculated by using two averaging filters. To avoid a bias in the slow energy calculation due to symbols affected by impulse and burst noise the slow energy may be calculated only during periods of time when no impulse noise is detected.

An initial impulse event is identified for sequential On_Num input samples that fulfill the condition:

$$\text{Fast\_Energy} > TH * \text{Max}(\text{Slow\_Energy}, \text{Energy\_Min}) \text{ \& Impulse\_Off}$$

Where TH is a pre-defined threshold, TH *Energy_Min is the minimal energy required in order to declare impulse event, Impulse_Off is the state where no impulse event was identified.

An end of impulse event is declared for sequential Off_Num input samples that fulfill the condition:

$$\text{Fast\_Energy} < TH * \text{Max}(\text{Slow\_Energy}, \text{Energy\_Min}) \text{ \& Impulse\_On}$$

Where TH is a pre-defined threshold, TH *Energy_Min is the minimal energy required in order to declare an impulse event, Impulse_On is the state where an impulse event was identified.

In an embodiment, the slow energy calculation is the energy of the signal in the "steady state", where no impulse event is active and the fast energy calculation is the residual energy of the signal and will therefore get significantly higher during impulse events. So, when fast>slow*TH an impulse event is declared and when fast<slow*TH an end for impulse event is declared. Two different TH can be used (for example, TH_UP=3, TH_Down=1.5) so that the system will be more stable. As a result, information is obtained as to when each impulse, or noise, event began and when it ended. Therefore, information is available regarding the impulse event's length, periodicity, power, probability of occurrence (resulting in PDF estimation), etc. which may be determined by high-level blocks such as channel monitoring 26 and channel allocation 24. In addition, the information can be used to indicate that each symbol affected by an impulse event be considered as erred and used according to FIG. 14.

In an embodiment, a system may be provided with low false alarms regarding impulse noises. It is also generally desirable to avoid the one impulse event being identified as two shorter impulse events, because it may disrupt the statistics. As a result, certain conditions can be set to indicate when declare the beginning of impulse event and the end of impulse event. In an embodiment, On_Num and Off_Num may be set to improve reliability. For example, On_Num may be set such that On_Num=5, resulting in a beginning of impulse event ("Impulse_On") being declared only when 5 sequential samples would fulfill the condition of:

Fast_Energy>TH*Max(Slow_Energy, Energy_Min)&
Impulse_Off

Off_Num may be set to, for example, Off_Num=10, so that an end of impulse event ("Impulse_Off") would be declared only when 10 sequential samples would fulfill the condition of:

Fast_Energy<TH*Max(Slow_Energy, Energy_Min)&
Impulse_On

Using two different TH for initial/end of impulse event as well as using On_Num , Off_Num>1 may provide added stabilization. Energy_Min can be used if one wants to use absolute energy as minimal values for impulse event declaration. The output is a binary vector with the value "1" between each initial and end of impulse events. The information obtained from this module can be used, for example, to characterize the impairments: impulse/burst noises length characterizations; impulse/burst noises statistic characterizations such as periodicity, probability distribution function (PDF), etc.; and impulse/burst noises power. An input signal can be selected out of several options. For example, an A2D output. In this case the input signal is wide-band. Because impulse and burst noises are wide-band interferences the total power of the noise entering the module is higher resulting in higher probability of identifying impulse and burst noises. In another approach a decimated signal may be used. For example, an A2D output passed through decimating filters. This impairment identification and classification is particularly useful when no signal is transmitted within the relevant bandwidth and hence impulse and burst noises are easily identified. The "slow energy" can be calculated, for example, all the time or only when an impulse event is not detected. That way the "slow energy" would mainly characterize the power of white gaussian noise (WGN) and not of the impulse/burst noises, resulting in improved ability to identify impulse and burst noise events.

Figure 8:
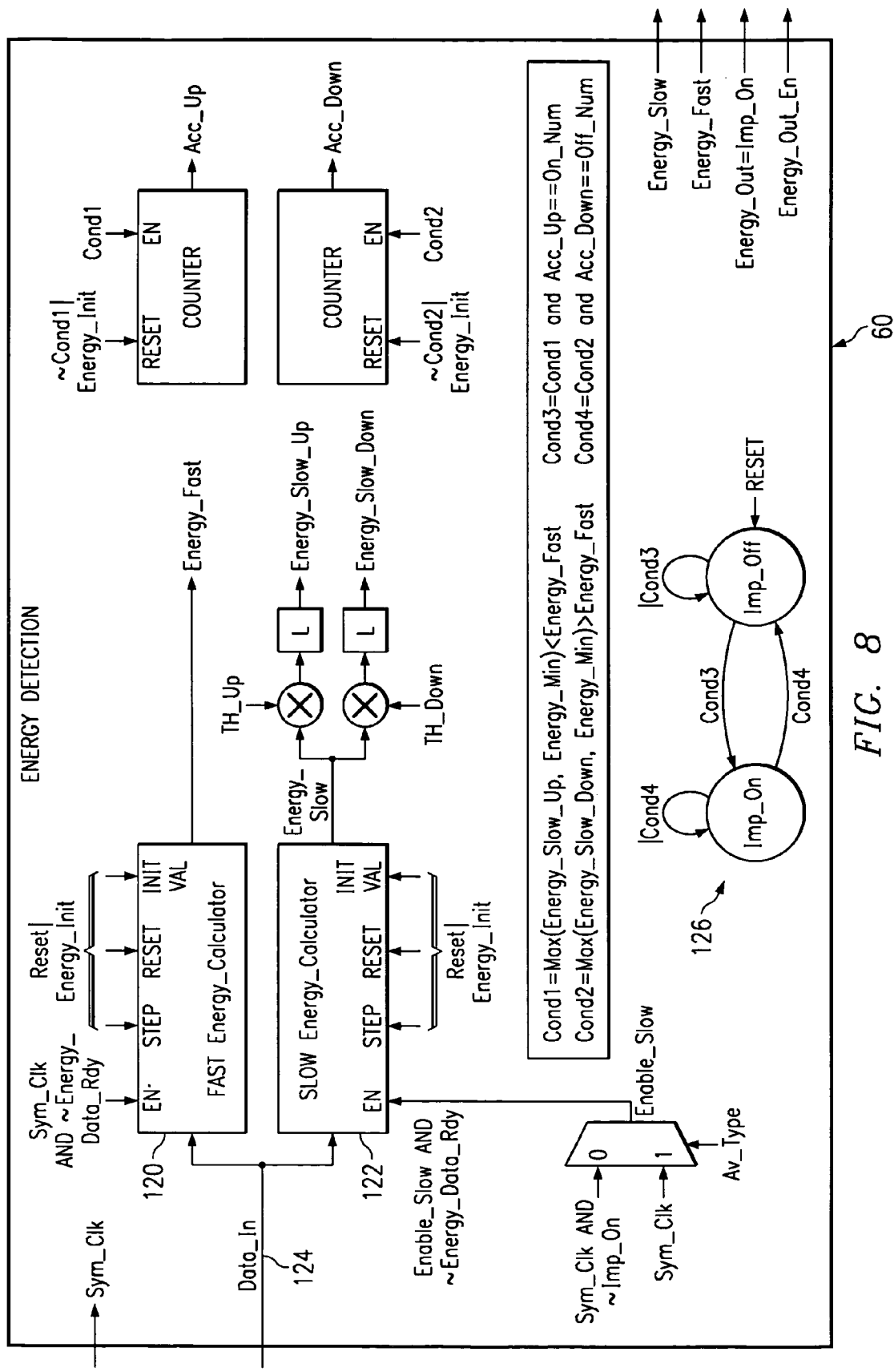
FIG. 8 is an exemplary implementation of an energy detection method of the present invention.

A block diagram of an example of an implementation of the energy detection method 60 can be seen in FIG. 8. The energy calculation blocks 120, 122 are used to generate the average power (both slow and fast energy) of the input data 124. An example of implementation of such a block 120, 122 can be seen in FIG. 7. In an embodiment, it is desirable that the slow energy calculator 122 average signal power during time periods without impulse and burst noise effect. A possible implementation is to avoid activating filter 122 during time periods where the burst and impulse impairments are active. An indication for such an implementation is provided when the flag Imp_On is high. An identification module such as that shown in state diagram 126 may be used to determine the beginning and end of noise events.

In another embodiment of the present invention, a method and system to estimate achievable performance if a high-order constellation is used, while using data received from the current lower-order constellation transmission is provided. This approach is particularly useful when no convolutional code is used. A "high-order constellation" refers to a constellation that transmits more bits per symbol and has higher points within the constellation, where "lower-order constellation" is vice versa.

Figure 9:
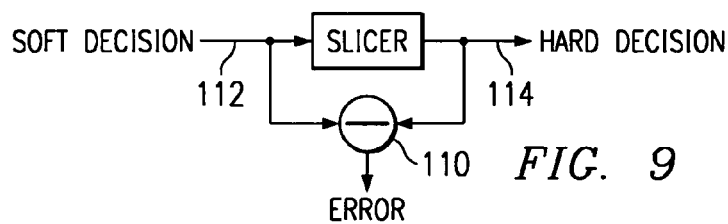
FIG. 9 is an exemplary implementation of a slicer of the present invention.

In an embodiment, as shown in FIG. 9, the noise 110 added to the transmitted signal is calculated by subtracting the signal 112 entering the slicer 116 (signal 112 is usually called "soft decision" and includes transmitted symbol+ added noise) from the slicer output 114 (usually called "hard decision" and includes only the transmitted symbol, assuming no slicing errors are generated). In an embodiment, the slicer 112 may be part of the baseband processing block 76.

The noise effect upon various potential constellations can be estimated, for example, by the following approach. An initial error noise event is identified for sequential On_Num input error samples that fulfill the condition:

{[|real(Error)|>TH_Up] or [|imag(Error)|>TH_Up]} and Event_Off

An end of error or noise event is declared for sequential Off_Num input error samples that fulfill the condition:

{[|real(Error)|<TH_Down] and [|imag(Error) |<TH_Down]} and Event_On

The output is a binary vector with the value "1" between each initial and end of events.

This approach is particularly useful when considering using a higher-order constellation in a communication system, based on information obtained from current lower-order constellation transmission. By setting On_Num=Off_Num=1 and TH_Up=TH_Down=$D_{min}$/2 of the higher constellation we can gather the statistics of the expected symbol errors should the higher constellation be used. This can be done without any risk because the receiver 54 keeps working using the current lower-constellation.

Figure 10:
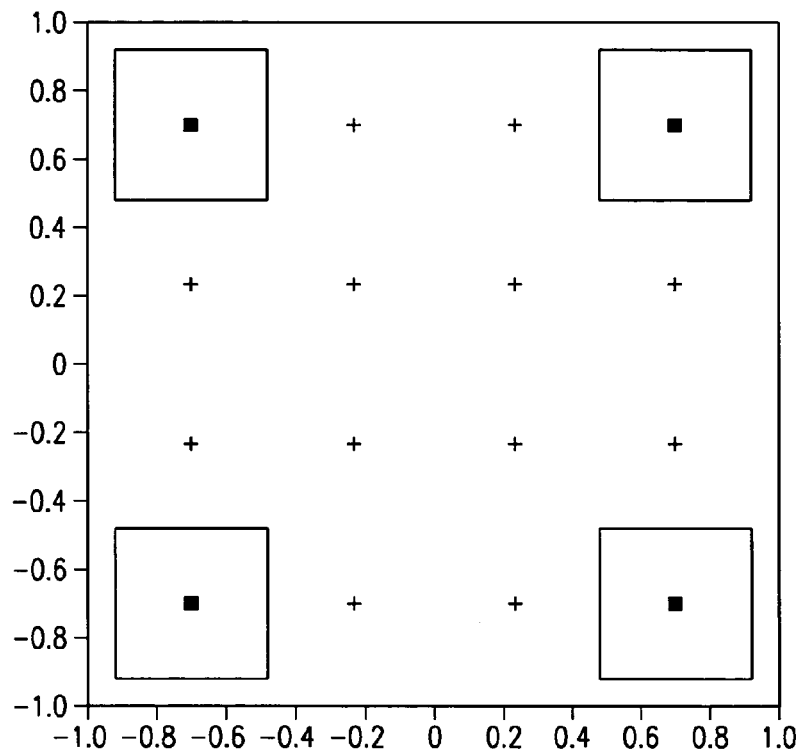
FIG. 10 illustrates an embodiment of a soft decision method of the present invention.
Figure 11:
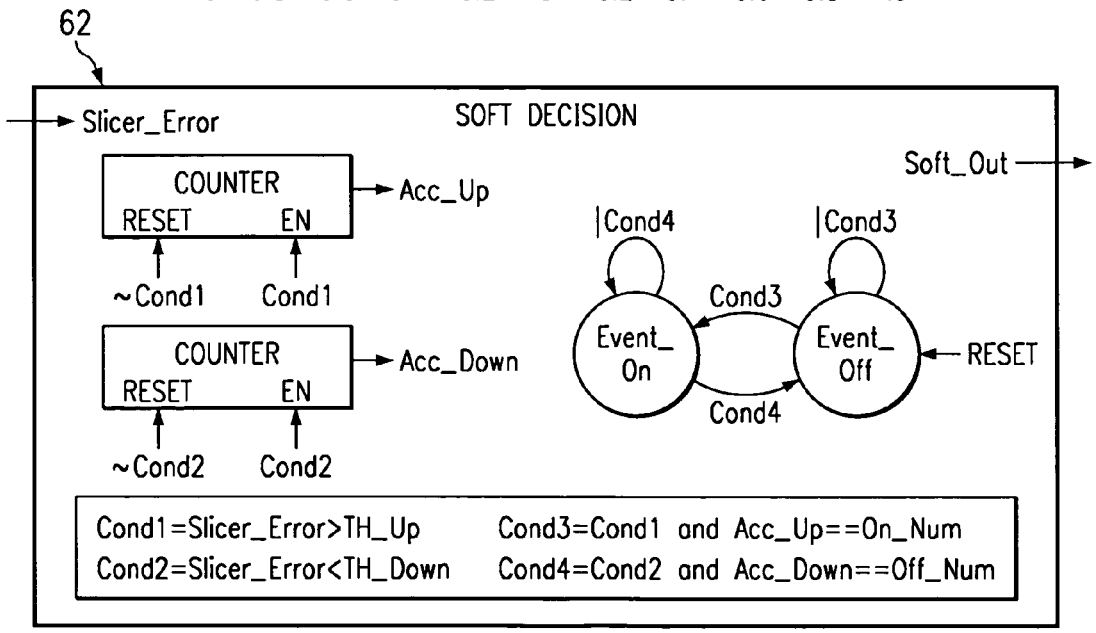
FIG. 11 is an exemplary implementation of a soft decision method of the present invention.

An example of potential shift from QPSK to 16QAM constellation can be seen in FIG. 10. The red outer-points show the constellation points of the current transmitted QPSK constellation. Assuming a move to a 16QAM constellation is considered, the blue constellation points (marks with a "+") would be added. By using the mechanism described above it is possible to count all received symbols that fall outside of the depicted squares. In other words: it is possible to find all symbols received with added noise that would generate slicer errors should a 16QAM constellation be used. By counting all the symbols that fall outside of the squares it is possible to estimate the feasibility of moving from QPSK to 16QAM.

By using other values for TH_Up,TH_Down,On_Num, Off_Num the user can control what kind of information is obtained. For example, by setting On_Num=3 only error events of 3 sequential errors would be detected. It is also possible to perform spectral analysis of the error in order to identify residual error characterization. This can be done using, for example, an FFT algorithm. The approach described above can be used to maximize channel throughput using a lower constellation, as previously described.

A Reed-Solomon (RS) code is a well-known code used in a variety of communication systems. Some systems, such as cable upstream transmission using a DOCSIS standard, support many possible RS codes. The possible RS codes may vary in the RS word length and the number of symbols corrected by the code. In an embodiment of the present invention, a method and system are provided for channel performance estimation using feedback from Reed-Solomon (RS) code and other methods that can take into consideration interleaver effects.

A problem addressed by this embodiment is as follows. Assuming the current transmission is using a RS code with certain parameters, it is desirable to check what the achieved performance would be if different parameters were used. This estimation is preferably done without actually changing the RS parameters used, i.e. without actual trial and error. Achieved performance can be measured by symbol error rate, RS symbol error rate, RS frame error rate or any other used unit. In many communication systems, such as in cable upstream transmission using the DOCSIS 2.0 standard, a rectangular RS symbol interleaver may be employed prior to the RS decoding (in A-TDMA). In that case-RS parameters (such as RS frame size) may affect the parameters used for the interleaver. An embodiment of the present invention provides a method and system to use feedback from the RS decoder and other methods in order to optimally choose the RS code parameters used and hence maximize achievable throughput. The approach provided can take into account the interleaver used in its estimation as shown in FIG. 14.

RS code is a widely used block code in variable communication systems. In general, RS is a block code of length N symbols with K information symbols and 2t parity symbols where N=K+2t. That code has the ability to correct up to t erred symbols per block. The code rate is defined as K/N. The RS code has many known and hardware efficient decoding techniques. The available RS decoding techniques have the ability to provide for each decoded RS symbol one of the following: 1) this symbol was not erred; 2) this symbol was erred and corrected; or 3) this symbol is part of a block with more than t errors, and hence no information can be provided if the symbol was erred or not.

A solution to the problem described above is to change the transmission profile and use an RS code with the desired parameters of $N_2$, $t_2$. This is, however, not generally the preferable solution because it lacks the ability to guarantee that the new transmission profile achieves the required symbol error rate (SER) and quality of service (QoS) and it involves substantially higher system complexity.

In an embodiment of the present invention, information obtained from the RS decoding 80 may be used to generate two histograms: RS number of errors histogram 70 and sequence of errors histogram 68.

In an RS number of errors histogram 70 with no interleaver approach an estimate is obtained of achievable performance if a different RS code (with parameters of $N_2$, $t_2$) is used, while using the current RS code. It is performed by checking the number of errors detected within the boundaries of a virtual RS word of length $N_2$.

This approach may employ, for example, the following method. This approach counts the number of erred RS symbols discovered in sequential $N_2$ RS symbols, where $N_2$ is the virtual RS word size considered. Every $N_2$ RS symbols: The number of erred RS symbols is used as an entry to the histogram. This entry is advanced by the value of one. T_Max is the maximal number of symbols the strongest allowed RS code can correct. If more than T_Max errors had occurred within a single virtual RS word of size $N_2$, it is assumed to be an uncorrected word and the histogram entry [Max_T+1] advances by one.

For example, an output histogram of [7 17 1 0], stands for: 7 N-symbols RS words with 1 erred symbol, 17 N-symbols RS words with 2 erred symbols, 1 N-symbols RS words with 3 erred symbols and 0 N-symbols RS words with 4 erred symbols were discovered. The data is preferably collected over a period of time in order to provide reliable statistics regarding the influence of channel impairments. The number of virtual RS frames required may vary from one implementation to the other. The RS number of errors histogram 70 (RS_error_num_histogram) should be divided by the number of virtual RS frames checked so that the x'th entry of the histogram would represent the probability to receive RS word of length N with x erred bytes.

Using the above histogram, find minimal t such that:

$$FER = \sum_{i=t+1}^{t\_Max+1} RS\_Error\_Num\_Histogram(i) < FER\_Target$$

Where T_Max is the maximal number of symbols the strongest allowed RS code and Fer_Target is the RS frame error rate target.

Calculate achieved rate:

$$Rate = \frac{N - 2t}{N}$$

In other words, the method described above can be used to check what the maximal throughput would be that achieves the required RS frame error rate, without actual trial and error. Higher-level managing modules can use this in order to optimally choose the RS parameters to use.

In an RS number of errors histogram 70 with a rectangular interleaver approach an estimate is obtained of achievable performance if a different RS code (with parameters of $N_2$, $t_2$) is used, while using the current RS code. This analysis is performed while taking into consideration interleaver effect. It is performed by checking the number of errors detected within the boundaries of virtual RS word of length $N_2$.

Referring to FIG. 12 as an example, the rectangular interleaver may be a memory array built of D rows and N columns. Input data may be, for example, entered row-by-row and output column by column. The deinterleaver, in this example, enters the data column by column and outputs it row-by-row. Thereby reversing the interleaver effect. The interleaver is used to combat impulse/burst noises since the process described above separates K sequential erred symbols to K distinct erred symbols, separated by D-1 non-erred symbols. This is useful when a RS code is employed. The dimension N of the rectangular interleaver (number of columns) is set to be equal the RS word length. The dimension D may be called "the interleaver depth". There are various other types of interleavers such as, for example, convolution interleavers. The DOCSIS 2.0 standard and the embodiments of the present invention described herein use a rectangular interleaver. However, as applicable to other standards and applications, the present invention may employ other types of interleavers.

Without interleaving, to accumulate data for a virtual RS word of length N count the number of errors in any sequential N inputs. With interleaving, considering different virtual RS lengths results in different interleaver depths (assuming interleaver total size is fixed). Generally, it is necessary to pass the input signal through an interleaver 130 according to the current transmission profile depth and N ($D_1$, $N_1$), to return to the original errors order generated by the channel. Then, it is necessary to pass the data through a deinterleaver 132, with the depth and N ($D_2$, $N_2$) to be considered, in order to estimate the performance achieved, and determine if the new RS parameters should be used. This requires an additional two memories for the new interleaver 130 and deinterleaver 132, which may result in substantial HW cost. In an embodiment of the present invention, no actual interleaver/deinterleaver is required and the interleaving 130/deinterleaving 132 process can be modeled using only index calculations and maintaining counters for the detected errors.

As an example, assuming the input data did not use an interleaver and the output data should use an interleaver of depth 3 ($D_1=1$, $D_2=3$). Instead of actually performing the deinterleaving process in the present invention it is possible to calculate the virtual deinterleaver 130 effect, as can be seen in the Table 6. Therefore, the interleaving and deinterleaving processes shown in figure 14 may be accomplished using accumulators or other appropriate approaches 130, 132, 134 for each process.

TABLE 6

| RS symbol order @ channel | Related to virtual RS word |
|---|---|
| 1 | 1 |
| 2 | 2 |
| 3 | 3 |
| 4 | 1 |
| 5 | 2 |
| 6 | 3 |
| ... | ... |
| 3N-2 | 1 |
| 3N-1 | 2 |
| 3N | 3 |

Therefore, a combination of an interleaving process and updating either or both of the RS_error_num_histogram 70 and the RS_error_seq histogram 68 can be done by applying, for example, three different accumulators 132 that count the number and sequence of erred RS symbols in a block of 3 $N_2$ symbols, as seen in Table 6.

If the current burst profile uses an interleaver: Before activating the $D_2$ accumulators 130, 132 as described above, for each input RS symbol it is necessary to know it's original order before the current burst profile deinterleaver (with parameters $D_1$, $N_1$) was used (i.e., it is necessary to virtually re-perform the interleaving (with parameters $D_1$, $N_1$) in order to return to the original RS symbol order, as seen from the channel).

The combination of interleaving 130+deinterleaving 132 can be done virtually following, for example, the approach below:

N1: RS word size of current burst profile.
D1: Interleaver depth of current burst profile.
N2: Virtual RS word size considered.
D2: Virtual interleaver depth considered.
x=1; TH=N1*D1; cnt=0; acc=0;
While (RS_Word_Cnt<RS_Word_Num)
    cnt=cnt+1;
    If (x==TH){
        TH=TH+N1*D1;
        x=x+1;
    else
        x=x+D1;
    end
    if (x>TH)
        x=x-(N1*D1-1);
    end
    if (x<=N2*D2)
        ind=x(mod D2) % mod=modulus
        acc=acc+1;
        err(ind)=err(ind)+in(cnt);
    end
    if (acc==N2*D2)
        RS_Word_Cnt= RS_Word_Cnt+D2;
        x=1-D1;
        acc=0;
        TH=N1*D1;
        Update_Histogram();
    end
end Turning to another example,
N1=3, D1=4, N2=2; D2=5 (N1*D1>N2*D2)

| Cnt (= Original order of bytes @ channel) | 1 | 2 | 3 | 4 | 5 | 6 | 7 | 8 | 9 | 10 | 11 | 12 |
|---|---|---|---|---|---|---|---|---|---|---|---|---|
| X (Order of bytes after de-interleaver, as seen by RS) | 1 | 5 | 9 | 2 | 6 | 10 | 3 | 7 | 11 | 4 | 8 | 1 |
| TH | 12 | 12 | 12 | 12 | 12 | 12 | 12 | 12 | 12 | 12 | 12 | 12 |
| Ind | 1 | 0 | 4 | 2 | 1 | 0 | 3 | 2 | X | 4 | 3 | 1 |
| acc | 1 | 2 | 3 | 4 | 5 | 6 | 7 | 8 | 8 | 9 | 10 | 1 |

In this example, the original order in the channel is 1, 2, 3, . . . 12, but due to the original interleaver effect (of N1, D1) at the output of the receiver deinterleaver the symbols are in order 1, 5, 9, 2, 6, 10, 3, 7 . . . In an embodiment, the effect if N2, D2 are used can be simulated or performed virtually without actually using an interleaver 130 or deinterleaver 132, 134. To properly process the input stream, as seen now (i.e.: 1, 5, 9, 2, . . . ). from the mode of operation of the deinterleaver (and according to table 6) each incoming sample may be related to a RS word index (number modulo D2). For example, 1→RS word 1; 5→RS word 0; 9→RS word 4 etc. In other words: to which RS words each symbol will be related is virtually estimated, if an N2, D2 interleaver is used. This data may then be used to update histograms 68 and 70. As previously discussed in an embodiment above, for each input symbol a binary input is available where "0" means "this symbol is not suspected of being erred" and "1" means the opposite. Input from the RS feedback method 64, energy detection method 60 and soft decision method 62 (note that for 60 and 62 a virtual interleaver is not needed. Only a virtual deinterleaver 134 need be used, as seen in FIG. 14). For each virtual RS word the number of erred bytes may be counted and input to the RS_ERR_NUM_histogram 70. The RS Sequence Histogram 68 may also be updated after counting the number of RS words with 0, 1, 2, . . . erred bytes would be received if D2, N2 parameters were used. The above may be performed while using the current burst profile with N1, D1 parameters.

Another example is provided below
N1=2, D1=5, N2=3; D2=4 (N1*D1<N2*D2)

| Cnt (= Original order of bytes @ channel) | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| X (Order of bytes after deinterleaver, as seen by RS) | 1 | 6 | 2 | 7 | 3 | 8 | 4 | 9 | 5 | 10 | 11 | 16 | 12 | 1 |
| TH | 10 | 10 | 10 | 10 | 10 | 10 | 10 | 10 | 20 | 20 | 20 | 20 | 10 |  |
| Ind | 1 | 2 | 2 | 3 | 3 | 0 | 0 | 1 | 1 | 2 | 3 | X | 0 | 1 |
| Acc | 1 | 2 | 3 | 4 | 5 | 6 | 7 | 8 | 9 | 10 | 11 | 11 | 12 | 1 |

Figure 15:
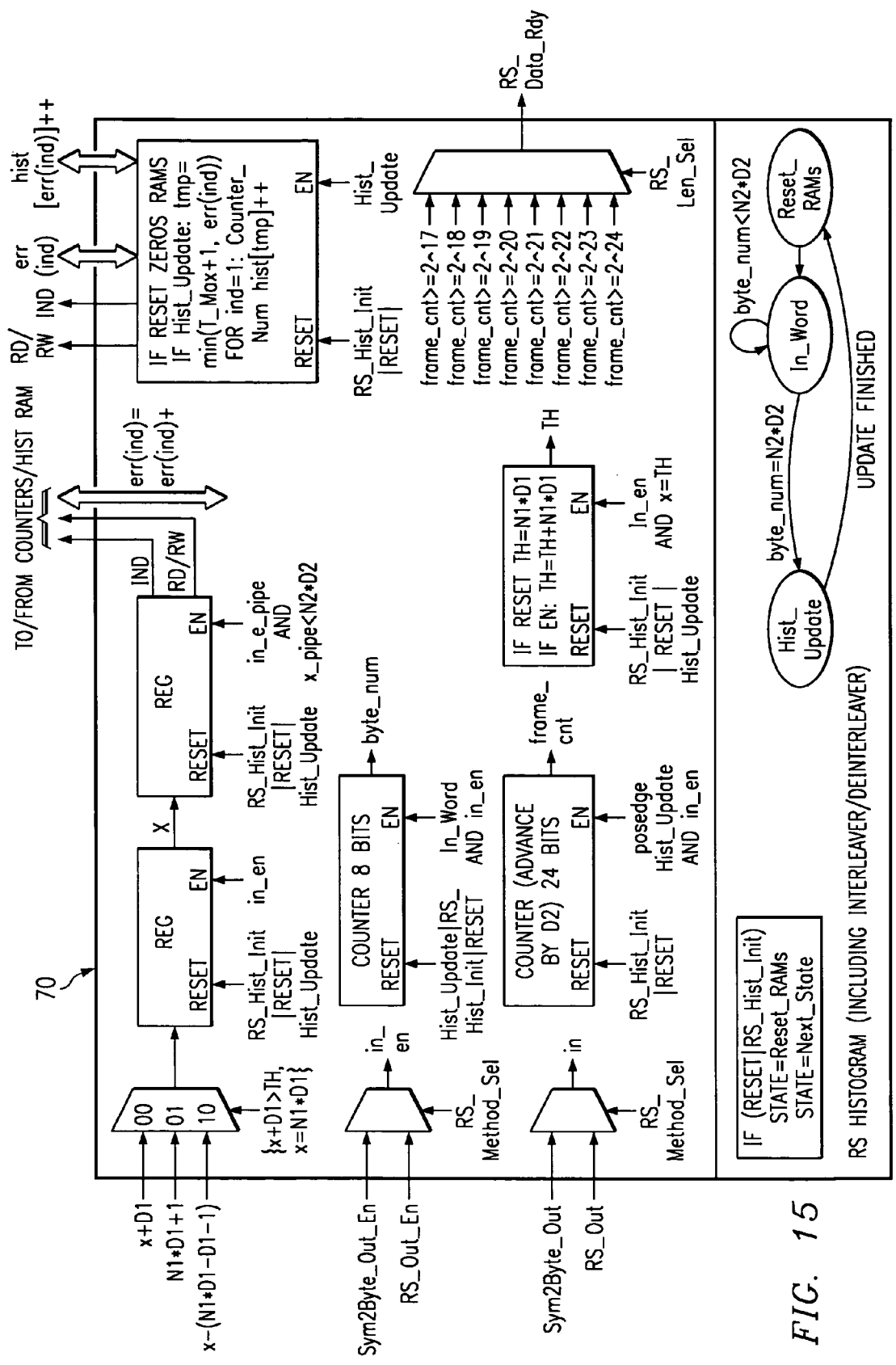
FIG. 15 is a block diagram and state machine of an exemplary implementation of a RS histogram (with interleaver/deinterleaver) of the present invention.
Figure 16:
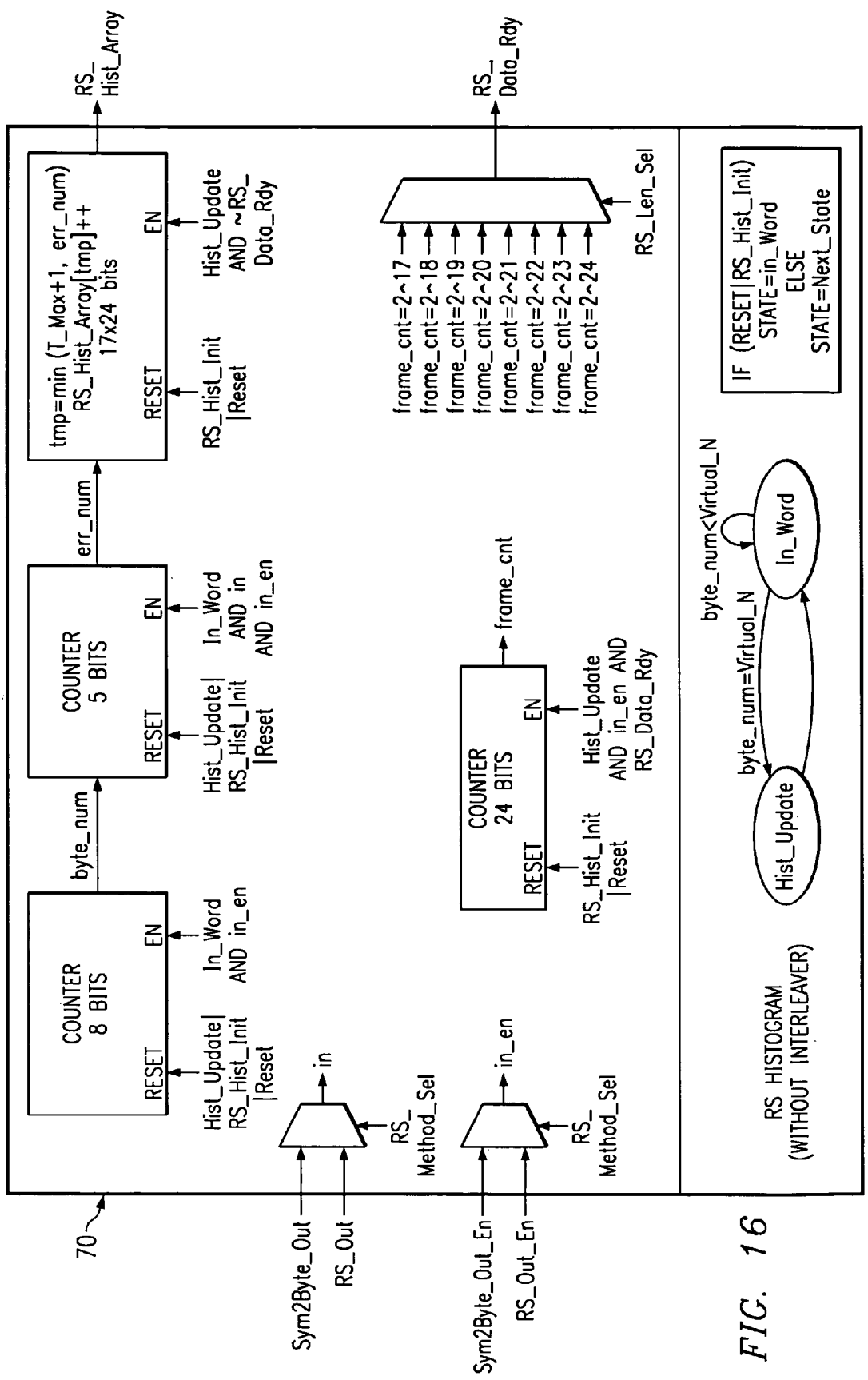
FIG. 16 is a block diagram and state machine of an exemplary implementation of a RS histogram (without interleaver/deinterleaver) of the present invention.

An example of the RS histogram unit block diagram and state machine when an interleaver is used can be seen in FIG. 15. An example of the RS histogram unit block diagram and state machine when an interleaver is not used can be seen in FIG. 16.

In an embodiment of the present invention, a RS number of errors histogram 70 can be generated. The information obtained from the RS decoding process can be used to identify the burst and impulse noises characteristics of the channel. It is achieved by counting number of errors bursts of length 1, 2, 3, . . . sequential errors.

For example, an output histogram of [87 7 2 0] stands for 87 error events of 1 symbol length, 7 error events of 2 symbols length, 2 error events of 3 symbols length and 0 error events of 4 symbols length were discovered. The histogram output can be divided by the number of symbols observed. If only white gaussian noise (WGN) is added to the channel it would be expected that the histogram would have entries of around [P $P^2$ $P^3$ $P^4$ . . . ], where P is the symbol error probability. Each histogram entry that is higher than expected characterizes the channel burst and impulse noises.

The two histograms 68, 70 described above can be generated using different feedbacks than the RS feedback described above. Various other approaches can provide an estimation if received symbols are erred or not. Two such approaches, energy detection 60 and soft decision 62 are described above.

Assuming a RS code is used, an approach to estimate the achieved performance can be as follows. Assuming the input data is a binary vector, where 1/0 means "this symbol is suspected/not suspected of being erred", respectively, in order to analyze RS effect upon the erred symbol it is desirable to transform the erred symbol indications to an erred RS symbols indication (in the DOCSIS upstream case: bytes). This can done by a "symbol→byte" module 150, described below.

The symbol→byte block 150 receives as input a vector of erred symbols (obtained, for example, from energy detection 60 or soft decision 62 methods) and transfers it to an output vector of erred RS symbols. The module assumes a worst-case scenario where if one erred symbol is related to two bytes it causes two RS symbol errors. A block diagram of an example implementation of this module can be seen in FIG. 18. Note that the word "pipe" as a postfix in signal's name means the signal is delayed by one clock.

The virtual interleaver effect, described above, can be added after the symbol→byte module 150. Note that, in the embodiment described, the indication if the symbols are erred or not is obtained in the receiver 54 prior to the deinterleaver. As such, only the effect of the new deinterleaver 134 should be added to the calculation (i.e. $D_1=1$ in the approach described above).

An embodiment as to how a higher-level can use information gained from the RS_err_num_histogram 70 described above in order to maximize channel throughput is described above. The sequence_histogram 68 can be generated as well using the symbol→byte block 150 output.

The goal of modern communication systems is to be robust while maximizing achieved capacity. To achieve this goal many standards allow the use of a variety of coding schemes, constellations, error coding capabilities and other transmission parameters. The actual transmission parameters in use should be tailored to the actual channel conditions. Hence, there is a need for methods and systems that analyze channel impairments using digital signal processing methods and determine the optimal transmission parameters accordingly. Furthermore, as channel conditions vary over time, these methods and systems should be adaptive. The capabilities of the receiver in use should be taken into consideration as well. In the present invention embodiments and examples are provided to achieve the benefits of adaptive approaches and demonstrate them in several contemporary standards. In the case of cable modem communication, an embodiment is provided that employs Upstream Channel Analysis (DUCA) adaptive approaches. The DUCA can be implemented using Digital Signal Processor (DSP). Simulation results of such adaptive approaches are provided below.

The DOCSIS 2.0 upstream standard provides good examples of the need for an adaptive mechanism that monitors channel conditions and choose transmission parameters accordingly. The cable network upstream channel is often the weakest link in the cable network infrastructure. Given the tree-and-branch topology of the cable network, noise and interferences from the entire network are accumulated at the headend. Common upstream impairments include the following noise sources: 1) white noise generated by active components in the network; 2) narrow band ingress noise that may result from Common Path Distortion; 3) high rate impulse noise originating from electric current; and 4) low rate wideband burst noise originating from several sources including electrical appliances in homes and laser clipping. In addition to the noise sources described above the upstream signal is also subject to multi-path reflections due to impedance mismatch of the plant's components and non-terminated cables.

The channel analyzer described herein has to account for various trade-offs in order to recommend transmission parameters. Following are a few examples. A typical trade-off is the choice of constellation and RS coding rate. Traditionally, the most common reaction to impulse noise in the channel is reducing the constellation size. However, this comes at the expense of upstream throughput. A better approach may be using larger constellations with stronger RS code. The choice is preferably made according to the resulting throughput. An additional trade-off with respect to the WGN is the possibility of using higher spectral density with a lower baud rate (and hence keeping total transmission power unchanged). This results in higher signal to noise ratio and may allow the use of larger constellations. Another example may be choosing the interleaver or spreader parameters when impulse and burst noise exists along with WGN. Assuming a rectangular interleaver is used, where the number of columns defines the RS word size and the number of rows defines the interleaver depth and hence its immunity to burst noise. If the WGN is dominant a maximal RS word size is preferable, even at the expense of interleaver depth whereas if the impulse and burst noise are dominant it may be preferred to have a larger interleaver depth, even at the expense of a shorter RS word. An even greater challenge for the upstream channel analyzer is when it is faced with the task of mitigating different types of noise simultaneously, especially when the optimal choice of parameters for each impairment are different. For example, when ingress is combined with burst noise, achieve in DOCSIS 2.0 is between a higher baud rate that will improve the performance of the ingress cancellation or a lower baud rate for greater immunity to long bursts. In an embodiment of the present invention a combination of frequency domain and time domain analysis is provided to determine the correct set of transmission parameters.

An impairment that may be analyzed using the frequency domain analysis is the ingress noise. For frequency domain analysis the following approach, for example, may be used. 1) Noise spectrum estimation. 2) Ingress and other impairment characterization. 3) Choice of frequency domain transmission parameters. In step 1, the noise spectrum estimation can be done by wideband sampling followed by a FFT calculation or alternatively by using a frequency-sweeping filter. In step 2 it is preferred to create a list of the ingresses, their center frequencies, bandwidths and powers. This can be done by several methods, for example, pattern recognition or the INCA analyzer 18. The goal of step 3 is to choose the carrier frequency, baud rate, constellation and other relevant transmission parameters of the upstream QAM signal. For that the ingress list of step 2 and the number of channels to allocate are taken into consideration. Another important consideration in step 3 is the ability of the receiver to handle ingresses that fall within the QAM signal band, that is, the ability for ingress cancellation. Ingress noises, which are too strong for ingress cancellation, may be avoided by shifting the QAM signal to a different band, while the weaker ingresses can be ignored, assuming that the receiver will be able to cancel them. The INCA analyzer 18 and channel allocation/reallocation 24, 25 methods may be used to implement these steps.

Figure 19:
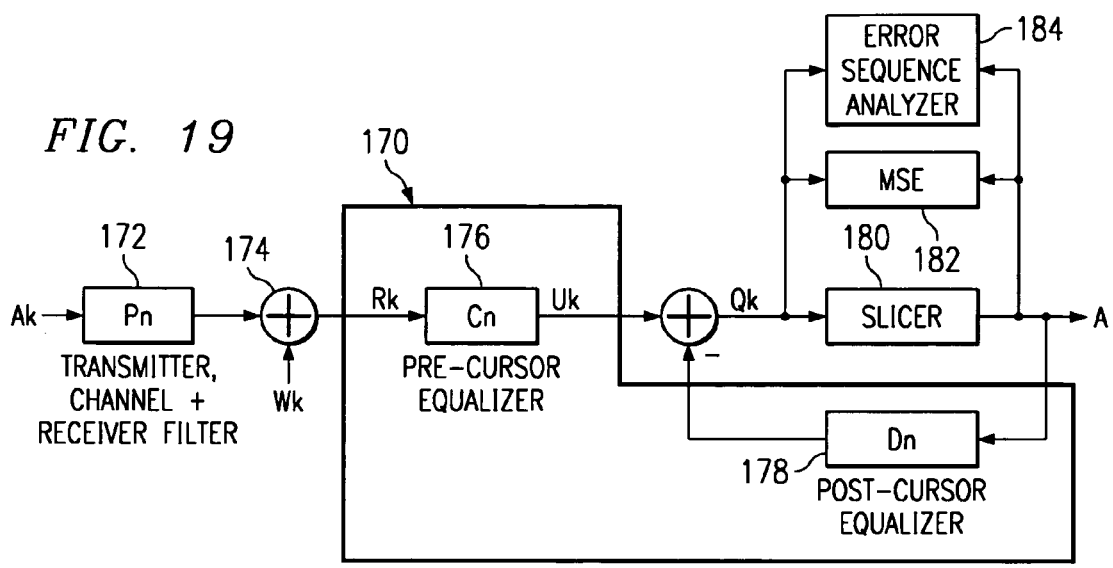
FIG. 19 illustrates a system block diagram of an alternative embodiment of the present invention.

FIG. 19 describes an example of a system that employs the above 3 steps and provides an alternative embodiment to the INCA analyzer 18 and time domain analyzer 20 described above. In this case, all possible carrier frequencies and baud rates are scanned thorough. For each baud rate and carrier a QAM training sequence is transmitted, which is used to train a Decision Feedback Equalizer 170.

$A_k$ 172 is the transmitted symbols in time k and $W_k$ 174 is added noise. It may be colored and include ingress, burst and impulse noises. The form of the Decision Feedback Equalizer 170 shown in FIG. 19 is assumed, in which the pre-cursor equalizer 176 is anti-causal with N coefficients and the post-cursor equalizer 178 is causal with M coefficients. Therefore, the slicer 180 input is given by the relation:

$$Q_k = \sum_{i=-(N-1)}^{0} c_i R_{k-i} - \sum_{l=1}^{M} d_l \hat{A}_{k-i}$$

The pre-known training sequence of length num+M+N is transmitted and is used to optimally train the decision feedback equalizer 170 using least square fit method. The main steps to least square fit method are described below:

Assuming no decision errors occurs: $Q_k \sim A_k = A_k$ and hence the following equations apply:

$$A_0 = c_{-(N-1)} \cdot R_{N-1} \quad + \ldots + c_0 \cdot R_0 - d_1 \cdot \hat{A}_{-1} \quad + \ldots + d_M \cdot \hat{A}_{-M}$$
$$A_1 = c_{-(N-1)} \cdot R_N \quad + \ldots + c_0 \cdot R_1 - d_1 \cdot \hat{A}_0 \quad + \ldots + d_M \cdot \hat{A}_{1-M}$$
$$\vdots \quad \vdots \quad \vdots$$
$$A_{num} = c_{-(N-1)} \cdot R_{num+N-1} \quad + \ldots + c_0 \cdot R_{num} - d_1 \cdot \hat{A}_{num-1} \quad + \ldots + d_M \cdot \hat{A}_{num-M}$$

We define:

$$\underline{\theta} = [\, c_{-(N-1)} \; \cdots \; c_0 - d_1 \; \cdots - d_M \,]^t$$

$$\underline{A} = [\, A_0 A_1 \cdots A_{num} \,]^t$$

$$H = \begin{bmatrix} R_{N-1} & \cdots & R_0 & \hat{A}_{-1} & \cdots & \hat{A}_{-M} \\ \vdots & & \vdots & \vdots & & \vdots \\ R_{num+N-1} & \cdots & R_{num} & \hat{A}_{num-1} & \cdots & \hat{A}_{num-M} \end{bmatrix}$$

The equations above can be expressed as: $\underline{A} \approx H \cdot \underline{\theta}$ and can be solved using least square fit method:

$$\hat{\theta}_{ls} = (H^t H)^{-1} H^t \underline{A}$$

Calculation of $(H^t H)^{-1}$ requires calculating the autocorrelation of R and of A, sample cross correlation between R and A, and then inversion of an (M+N)×(M+N) matrix.

After the training is complete, one can learn about the characteristics of the in-band noise by observing the nulls in the equalizer frequency response. In addition, the MSE 182 calculation can be used to predict the expected performance of each carrier-baud rate combination assuming the receiver used implements the Decision Feedback Equalizer 170 structure described. After scanning through all possible carrier frequencies and baud rates best transmission parameters can be determined.

The main channel impairments that can be characterized using the time domain analysis are the impulse and burst noises. These impairments can be mitigated using the RS code, byte interleaver, S-CDMA spreader and other transmission parameters. In an embodiment of the present invention, the DOCSIS 2.0 CMTS can dynamically track impulse levels, and optimally set transmission parameters accordingly. Impulse strength, as well as impulse frequency and arrival statistics can be determined by employing various power detectors that measure the signal level during quiet periods or in adjacent unoccupied frequencies. An additional impairment that may be tracked is the white gaussian noise (WGN). Using the right choice of transmission spectral density, constellation, RS parameters and number of active codes in S-CDMA transmission can mitigate this impairment.

Returning to the example depicted in FIG. 19, after the training is complete burst of errors can be identified in the error sequence analyzer 184. The information is used to characterize the impulse and burst noise affecting the channel and to determine transmission parameters accordingly. Both the time domain and frequency domain algorithms, described above, may be implemented using a digital signal processor (DSP) and/or dedicated HW hooks.

Figure 20:
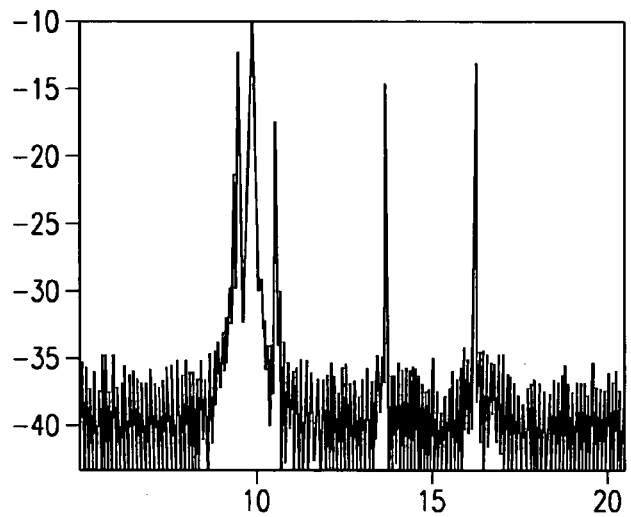
FIG. 20 illustrates simulation results of an upstream channel spectrum using an embodiment of the present invention.
Figure 21A:
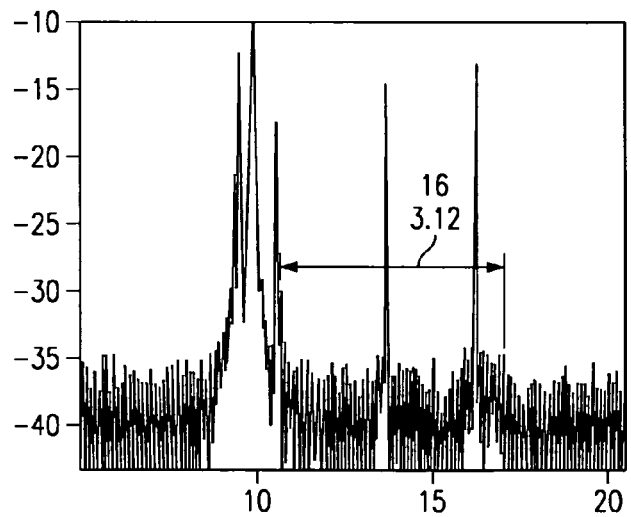
FIG. 21 illustrates simulation results of an allocation of 1-4 upstream channels using an embodiment of the present invention.
Figure 21B:
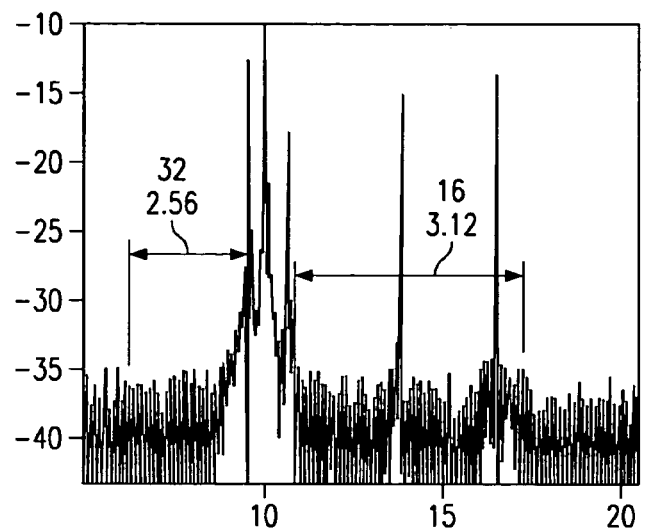
Figure 21C:
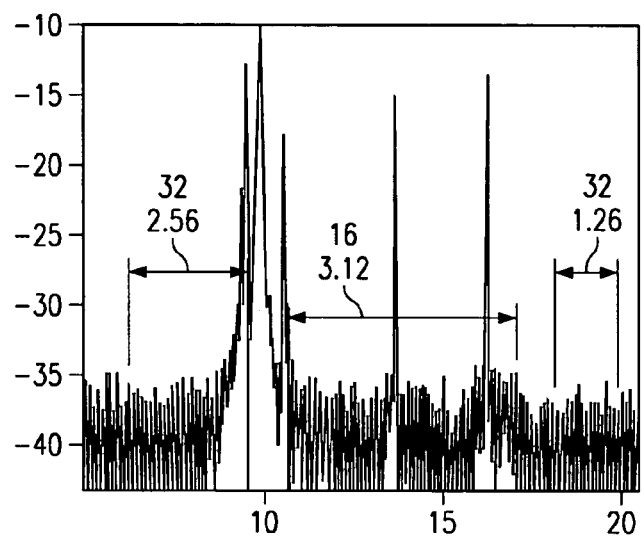
Figure 21D:
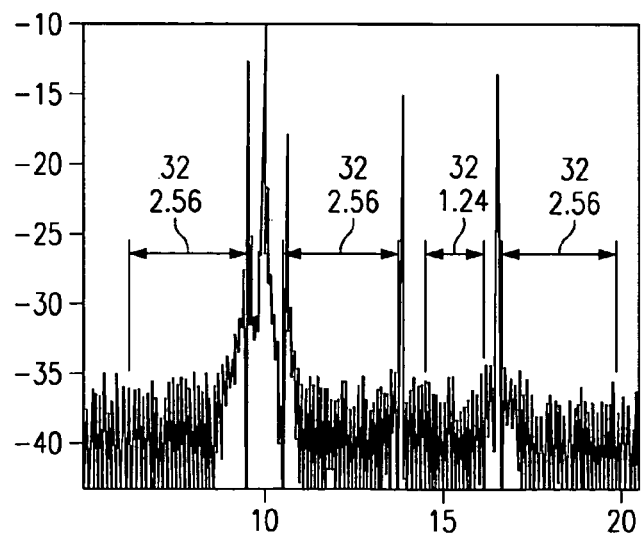

FIG. 20 provides simulation results using the embodiment described above. An upstream channel with multiple ingress was simulated as illustrated in FIG. 20. It was assumed that the spectral density of the QAM signal is restricted to a certain total channel power. In addition to ingress, this simulated channel is also corrupted by time-domain impairments, such as burst and impulse noises, which cannot be seen in the frequency-domain analysis.

Without DUCA capabilities in the CMTS, dynamic changes of the channel cannot be tracked, and therefore a robust mode, which can operate in worst-case scenarios, needs to be used. A typical choice of parameters for such a channel would include QPSK constellation, strong RS code and medium/low baud rate (2.56 Mbaud or even 1.28

Mbaud) to avoid in-band ingress noise. This results in upstream throughput of ~2.5-5 Mbit/sec, far below the optimum. Therefore, DUCA enables higher throughput in this channel. The DUCA approaches identify and characterize the channel impairments (WGN, burst and impulse noises, ingress noise etc.), while taking into consideration ingress cancellation and other noise mitigation capabilities of the receiver. The impairment characterization is followed by an optimal channel allocation.

FIG. 21 shows the output of the channel analyzer for one up to four upstream channels. For each allocated channel the baud rate (1.28-5.12 Mbaud) and constellation used (16 or 32 QAM) are defined so that maximal throughput is achieved. Note that for one upstream channel, the channel allocation approach determines that the highest throughput can be achieved by using the highest baud-rate of 5.12 Mbaud and a 16-QAM constellation while overlapping two ingresses. The channel allocation block determines that avoiding the ingress by reducing the baud-rate would not result in higher throughput even if a more spectrally efficient constellation can consequently be used. Another interesting result of the allocation approach can be seen when moving from three allocated channels to four allocated channels. Until the third allocated channel each new channel was allocated without affecting previously allocated channels parameters (i.e., carrier frequency and baud rate). When moving from 3 allocated channels to 4 allocated channels the allocation approach determined that higher total throughput could be attained if the first and the third allocated channels were changed also. (Note that the heights of the squares do NOT represent the allocated channel spectral density). The transmission parameters selected result in upstream throughput of ~20 Mbit/sec, a 4X-8X improvement compared to the over-robust transmission in the CMTS without DUCA.

Thus, a system and method are provided for improving parameter selection in a communication system. While the invention has been described with reference to illustrative embodiments, this description is not intended to be construed in a limiting sense. Various other embodiments of the invention will be apparent to persons skilled in the art upon reference to this description. For example, while the present invention is described with respect to upstream communication, it is applicable other forms of communication such as downstream communication and applications besides cable. Although specific embodiments address optimizing receiver parameters, the present invention finds application to optimizing other transmission parameters of a communication system. Moreover, a person skilled in the art, from the descriptions of the illustrative embodiments herein, would recognize other embodiments for practicing the present invention. It is therefore contemplated that the appended claims will cover any such modifications of the embodiments as fall within the true scope and spirit of the invention.

What is claimed is:

1. A method to automatically optimize channel throughput using current constellation size in a communication system having a set of current forward error parameters and a current data rate comprising:
   receiving input from one or more modules dedicated to identify and characterize impairments in the channel;
   analyzing the impairments to generate statistics on occurrences of impairments by virtually considering a plurality of forward error correction (FEC) parameters;
   searching for a set of new forward error correction parameters which provide maximal channel throughput;
   choosing a frame error target;
   estimating a new frame error rate and a new data rate for the set of new forward correction parameters based on the impairments statistics; and
   replacing the current forward error correction parameters with the new forward error correction parameters if the new data rate is greater than the current data rate and the new frame error rate is lower than the frame error target.

2. The method of claim 1 wherein the searching is a simple sequential search.

3. The method of claim 1 wherein the searching is a regular binary search.

4. The method of claim 1 wherein the searching is an interleaver based binary search.

5. The method of claim 1 wherein the forward error correction parameters are Reed-Solomon code parameters.

* * * * *